(12) United States Patent
Eylem et al.

(10) Patent No.: US 7,537,863 B2
(45) Date of Patent: *May 26, 2009

(54) PRIMARY ALKALINE BATTERY CONTAINING BISMUTH METAL OXIDE

(75) Inventors: Cahit Eylem, Bellingham, MA (US); Xiandong Wang, Acton, MA (US); Paul A. Christian, Norton, MA (US); Rita Komm, Needham, MA (US)

(73) Assignee: The Gillette Company, Boston, MA (US)

( * ) Notice: Subject to any disclaimer, the term of this patent is extended or adjusted under 35 U.S.C. 154(b) by 174 days.

This patent is subject to a terminal disclaimer.

(21) Appl. No.: 10/913,922

(22) Filed: Aug. 6, 2004

(65) Prior Publication Data

US 2005/0058903 A1 Mar. 17, 2005

Related U.S. Application Data

(63) Continuation-in-part of application No. 10/716,358, filed on Nov. 17, 2003.

(60) Provisional application No. 60/503,667, filed on Sep. 16, 2003.

(51) Int. Cl.
*H01M 4/36* (2006.01)

(52) U.S. Cl. .............. 429/220; 429/231.8; 429/231.95

(58) Field of Classification Search ............ 429/231.95, 429/218.1, 224, 231.5, 231.8, 219, 229, 231.6, 429/129, 145, 300, 304, 220

See application file for complete search history.

(56) References Cited

U.S. PATENT DOCUMENTS

| | | | |
|---|---|---|---|
| 2,809,225 A * | 10/1957 | Morehouse et al. | 429/188 |
| 2,828,350 A | 3/1958 | Rhyne, Jr. | |
| 3,415,687 A | 12/1968 | Methlie, II | |
| 3,822,148 A | 7/1974 | Dey et al. | |
| 3,853,627 A | 12/1974 | Lehmann et al. | |
| 4,085,259 A | 4/1978 | Lauck | |
| 4,113,929 A | 9/1978 | Margalit | |
| 4,158,723 A | 6/1979 | Gabano et al. | |

(Continued)

FOREIGN PATENT DOCUMENTS

EP 0 127 134 12/1984

(Continued)

OTHER PUBLICATIONS

Fiordiponti et al., "Behavior of Bi2O3 as a Cathode for Lithium Cells", Journal of the Electrochemical Socisety, pp. 14-17.*

(Continued)

*Primary Examiner*—Patrick Ryan
*Assistant Examiner*—Monique Wills
(74) *Attorney, Agent, or Firm*—Fish & Richardson P.C.

(57) ABSTRACT

A battery includes a cathode having an oxide containing one or more metals and pentavalent bismuth, an anode, a separator between the cathode and the anode, and an alkaline electrolyte. The metal(s) can be an alkali metal, an alkaline earth metal, a transition metal, and/or a main group metal. The separator can be ion-selective or capable of substantially preventing soluble bismuth ionic species from diffusing from the cathode to the anode.

96 Claims, 16 Drawing Sheets

U.S. PATENT DOCUMENTS

| | | | |
|---|---|---|---|
| 4,184,016 | A | 1/1980 | Lecerf |
| 4,229,509 | A | 10/1980 | Margalit |
| 4,233,374 | A | 11/1980 | Lecerf |
| 4,247,610 | A * | 1/1981 | Thornton ..................... 429/199 |
| 4,268,588 | A | 5/1981 | Lecerf et al. |
| 4,271,243 | A | 6/1981 | Broussely et al. |
| 4,309,491 | A | 1/1982 | Brec et al. |
| 4,444,857 | A | 4/1984 | Duchange et al. |
| 4,804,597 | A | 2/1989 | Tahara et al. |
| 5,368,957 | A | 11/1994 | Kozmik et al. |
| 5,389,469 | A | 2/1995 | Passaniti et al. |
| 5,589,109 | A | 12/1996 | Passaniti et al. |
| 5,658,688 | A | 8/1997 | Jolson |
| 5,780,186 | A * | 7/1998 | Casey, Jr. .................... 429/229 |
| 5,952,124 | A | 9/1999 | Kainthla et al. |
| 6,001,508 | A * | 12/1999 | Passaniti et al. ............. 429/219 |
| 2003/0082450 | A1 | 5/2003 | Tanoue et al. |
| 2004/0121235 | A1 | 6/2004 | Amatucci |
| 2008/0008937 | A1* | 1/2008 | Eylem et al. ............. 429/218.1 |

FOREIGN PATENT DOCUMENTS

| | | |
|---|---|---|
| GB | 2202670 | 9/1988 |
| JP | 55/111067 | 8/1980 |
| JP | 56/159067 | 12/1981 |
| JP | 58/001971 | 1/1983 |
| JP | 58/048357 | 3/1983 |
| JP | 04/002020 | 7/1992 |
| JP | 52/12425 | 8/1993 |
| JP | 406310116 A * | 11/1994 |
| WO | WO 2005/034267 A2 | 4/2005 |
| WO | WO 2006/110354 A1 | 10/2006 |

OTHER PUBLICATIONS

Sharma et al., Synthesis and characterization of $AgBiO_3$ with the cubic $KSbO_3$ structure, Indian Journal of Chemistry, vol. 43A, pp. 11-17, Jan. 2004.

Bervas et al., "Carbon Bismuth Oxyfluoride Nanocomposites as Cathode Material for Lithium Battery", Abs. 419, 206th Meeting, Electrochemical Society, 2004.

Antipov et al., "The Superconducting Bismuth-based Mixed Oxides", Journal of Low Temperature Physics, vol. 131, Nos. 3/4, May 2003.

Jain et al., "Nanosized Amphorous Iron Oxyhydroxide for Reversible Lithium Intercalation", Journal of the Electrochemical Society, 150, (6), pp. A806-A810, 2003.

Oberndorfer et al., "A New Approach to Silverbusmuthates", Z. Anorg. Allg. Chem., 628, pp. 1951-1954, 2002 (English Abstract Only).

Rodriguez et al., "Electrochemical study of the reaction of lithium with Aurivillius and related phases", Material Research Bulletin, 36, pp. 1195-1204, 2001.

Kumada et al., "Preparation of New Bismuth Oxides by Hydrothermal Reaction", Mat. Res. Soc. Symp. Proc., vol. 658, pp. GG8.71-GG8.76, 2001.

Liu et al., "Synethesis of superconducting $Ba_{1-x}K_xBiO_3$ by a modified molten salt process", Materials Research Bulletin, 36, pp. 1505-1512, 2001.

Patoux et al., "Lithium- and Proton-Driven Redox Reactions in BIMEVOX-Type Phases", Chem. Mater., 13, 500-7, 2001.

Arroyo et al., "From $Bi_4V_2O_{11}$ to $Li_{28}B_4V2O_{11}$ by electrochemical lithium insertion: versatile applications in lithium batteries", International Journal of Inorganic Materials, 1, pp. 83-86, 1999.

Apostolova et al., "Study of Bismuth-containing Oxide Compounds as Cathode Materials for Lithium Batteries", Russian Journal of Applied Chemistry, vol. 72, No. 8, pp. 1377-1380, 1999.

Kumada et al., Ion-exchange reaction of $Na^+$ in $NabiO_3$ $nH_2O$ with $Sr^{2+}$ and $Ba^{2+}$, Solid State Ionics, 122, pp. 183-189, 1999.

Deibele et al., "Bismuth in $Ag_2BiO_3$:Tetravalent or Internally Disproportionated", Journal of Solid State Chemistry, 147, pp. 117-121, 1999.

Kumada et al., "Preparation of $ABi_2O_6$ (A=Mg, Zn) with the Trirutile-type Structure", Materials Research Bulletin, vol. 32, No. 8, pp. 1003-2008, 1997.

Lazure et al., "Composition dependence of oxide anion conduction in the BIMEVOX family", Solid State Ionics, 90, pp. 117-123, 1996 (Abstract only).

Arroyo et al., "$Bi_4V_2O_{11}$ and related compounds as positive electrode materials for lithium rechargeable batteries", Solid State Ionics, 91, pp. 273-278, 1996.

Kumada et al., "Preparation and Crystal Structure of a New Lithium Bismuth Oxide: $LiBiO_3$", Journal of Solid State Chemistry, 126, pp. 121-126, 1996.

Pasquali et al., "Primary 1.5 Lithium Cells with $ViVO_4$ Cathodes", Journal of Power Sources, 27, pp. 29-34, 1989.

Takeuchi et al., "The Reduction of Silver Vanadium Oxide in Lithium/Silver Vanadium Oxide Cells", J. Electrochem. Soc.: Electrochechemical Science and Technology, vol. 135, No. 11, pp. 2691-2694, 1988.

Pistoia et al., "Button Cells Based on the $Li/Bi_2O_3$ Couple", Journal of Power Sources, 16, pp. 263-269, 1985.

Linden in "Handbook of Batteries and Fuel Cells", Handbook of Batteries and Fuel Cells, pp. 11-79-11-81, 1984.

Trehoux et al., Synthese et Caracterisation de Nouvelles Phases due Diagramma (K Ou Na)—Bi—O, Mat. Res. Bull, vol. 17, pp. 1235-1243, 1982 (English abstract).

Cox, "Mixed-Valent $Ba^2Bi^{3+}Bi^{5+}O6$:Structure and Properties vs. Temperature", Acta Cryst., B35, pp. 1-10, 1979.

Murphy et al., "Topochemical Reactions of Rutile Related Structures with Lithium", Mat. Res. Bull. vol. 13, pp. 1395, 1402, 1978.

Blasse, "On the Structure of some Compounds $Li_3Me^5+O_4$ and some other Mixed Metal Oxides Containing Lithium", Zeitschrift fur anorganishe und allegemeine Chemie Band 331, pp. 44-51, 1964.

Scholder et al., "Alkali and alkaline and earth bismuthates", Zeitschrift fur anorganishe und allegemeine Chemie Band 319, pp. 375-386, 1963 (English Abstract Only).

Latimer "The Oxidation States of the Elements and Their Potentials in Aqueous Solutions", 2nd ed., Prentice-Hall, New York, pp. 122-123, 1952.

Scholder et al., "On Bismuthates", Zeitschrift fur anorganishe und allegemeine Chemie 247, pp. 392-415, 1941 (English Translation).

Nguyen et al., "Electrosynthesis of $KBiO_3$: A Potassium Ion Conductor with the $KSbO_3$ Tunnel Structure", Chem. Mater., vol. 5, pp. 1273-1276, 1993.

Hubenthal et al., "The First Quaternary Oxobismuthate(V): $KLi_6BiO_6$", Acta Chemica Scandinavica, vol. 45, pp. 805-811, 1991.

Nomura et al., "Brief Communication Ionic Conductivity of $Li_7BiO_6$", Journal of Solid State Chemical Chemistry, vol. 52, pp. 91-93, 1984.

Kumada et al., "Neutron Powder Diffraction Refinement Of Ilmenite-Type Bismuth Oxides: $AbiO_3$ (A=Na, Ag)", Materials Research Bulletin, pp. 2397-2402, vol. 35, No. 14/15, Nov. 2000.

Kumada et al., "Synthesis Of New Ilmenite-Type Oxides, AgMO (M=Sb,Bi) By Ion-Exchange Reaction", Advances in Ion Exchange for Industry and Research, pp. 212-217, 1999.

Kumada et al., "Preparation of $Ab_2O_6$ (A+Mg, An) With The Trirutile-Type Structure", Materials Research Bulletin, pp. 1003-1008, vol. 32, No. 8, Aug. 1997.

Mergen et al., "Crystal Chemistry, Thermal Expansion And Dielectric Properties Of $(Bi_{1.5}Zn_{0.5})O_7$ Pyrochlore", Materials Research Bulletin, pp. 175-189, vol. 32, No. 2, Jan. 1997.

Kumada et al., "Crystal Structure of $Bi_2O_4$ with $\beta$-$Sb_2O_4$-Type Structure", Journal of Solid State Technology, pp. 281-285, vol. 116, No. 2, May 1995.

Kinomura et al., "Preparation of Bismuth Oxides with Mixed Valence from Hydrated Sodium Bismuth Oxide", Materials Research Bulletin, pp. 129-134, vol. 30, No. 2, Feb. 1995.

Passaniti et al., "Silver Oxide Cells", Handbook of Batteries, pp. 12.1-12.16, 1995.

Lovrecek et al., "Monographs in Electroanalytical Chemistry and Electrochemistry", Standards Potential in Aqueous Solution, pp. 180-187, 1985.

Broussely et al., "Lithium-Bismuth Metal Oxide Cells", Lithium Batteries, pp. 97-114, 1983.

Fiordiponti et al., "Behavior of $Bi_2O_3$ as a Cathode for Lithium Cells", Journal of the Electrochemical Society, pp. 14-17, Jan. 1978.

Muylder et al., "Bismuth", Cebelcor, pp. 534-539, 1957.

Kinoshita, "Properties of Bismuth Oxide as an Active Material of Negative Electrode in Alkaline Storage Cell", Bull. Chem. Soc., Japan, pp. 59-65, 1940.

* cited by examiner

FIG. 2

Theoretical Volumetric Capacities and Energy Densities (total cell) for 1.5V alkaline zinc cells containing metal bismuth oxides

| Cathode Material | Electrons per formula unit | Theoretical Specific Capacity (mAh/g) | Average CCV (V) | Density (g/cm$^3$) | Theoretical Volumetric Capacity (Ah/cm$^3$) | Theoretical Energy Density (total cell)[a] (Wh/L) |
|---|---|---|---|---|---|---|
| KBiO$_3$ | 2 | 181 | 1.65 | 5.87 | 1.06 | 1484 |
| AgBiO$_3$ | 3 | 220 | 1.5 | 8.18 | 1.81 | 2072 |
| ZnBi$_2$O$_6$ | 4 | 185 | 1.65 | 8.44 | 1.56 | 2035 |
| MgBi$_2$O$_6$ | 4 | 199 | 1.68 | 7.92 | 1.58 | 2088 |
| SrBi$_2$O$_6$ | 4 | 178 | 1.65 | 7.01 | 1.25 | 1700 |
| CdBi$_2$O$_6$ | 4 | 171 | (1.5)[b] | (8.2)[b] | 1.40 | 1698 |
| CuBi$_2$O$_7$ | 6 | 245 | (1.4)[b] | (8.2)[b] | 2.01 | 2093 |

[a] assuming discharge capacity of cathode and anode balanced

[b] estimated value

FIG. 3

| Example | M = | Calculated (weight percent) | | | | Observed (weight percent) | | | | |
|---|---|---|---|---|---|---|---|---|---|---|
| | | Na | Co | M | Bi | Na (ppm) | Co | M | Bi |
| 1a | Zn | 0 | 0 | 11.29 | 72.14 | 81 | --- | 10.85 | 65.88 |
| 1b | Zn | 0 | 1.92 | 10.95 | 69.98 | 75 | 1.46 | 8.09 | 66.22 |
| 2a | Mg | 0 | 0 | 4.52 | 77.65 | --- | --- | --- | --- |
| 2b | Mg | 0 | 1.92 | 4.38 | 75.32 | <34 | 1.95 | 4.05 | 68.00 |
| 3 | Cu | 0 | 0 | 19.34 | 63.61 | <44 | --- | 14.45 | 60.29 |
| 4 | Ag | 0 | 0 | 29.57 | 57.28 | 7200 | --- | 27.66 | 52.73 |

"---" = not analyzed

FIG. 7

| Example | Cathode Material | Low-rate Capacity To 0.8V (mAh/g) | Percent Utilization | Low-rate Capacity To 0.6V (mAh/g) | Percent Utilization | High-rate Capacity To 0.8V (mAh/g) | Percent Utilization | High-rate Capacity To 0.6V (mAh/g) | Percent Utilization |
|---|---|---|---|---|---|---|---|---|---|
| 1a | $ZnBi_2O_6$ | 30 | 16 | ND | ND | ND | ND | ND | ND |
| 1b | CoOOH-coated $ZnBi_2O_6$ | 95 | 51 | 320 | 69 | 52 | 28 | ND | ND |
| 2a | $MgBi_2O_6$ | 77 | 40 | 309 | 62 | 85 | 43 | 300 | 60 |
| 2b | CoOOH-coated $MgBi_2O_6$ | 116 | 58 | 326 | 65 | 89 | 45 | 310 | 60 |
| 3 | $Cu_2Bi_2O_7$ | 50 | 20 | 330 | 58 | 35 | 14 | 170 | 30 |
| 4 | $AgBiO_3$ | 139 | 63 | 320 | 72 | 165 | 75 | 377 | 86 |
| 5b | CoOOH-coated $KBiO_3$ | 105 | 58 | 357 | 79 | 70 | 39 | 369 | 81 |
| 6 | CoOOH-coated $SrBi_2O_6$ | 88 | 50 | ND | ND | 67 | 38 | ND | ND |
| C1 | $NaBiO_3$ | 20 | 10 | 320 | 73 | ND | ND | ND | ND |
| C2 | $Bi_2O_4$ | 20 | 18 | 336 | 75 | 0 | 0 | 360 | 81 |
| C3 | $Bi_2O_3$ | 0 | 0 | 250 | 72 | 0 | 0 | 125 | 73 |

ND = not determined

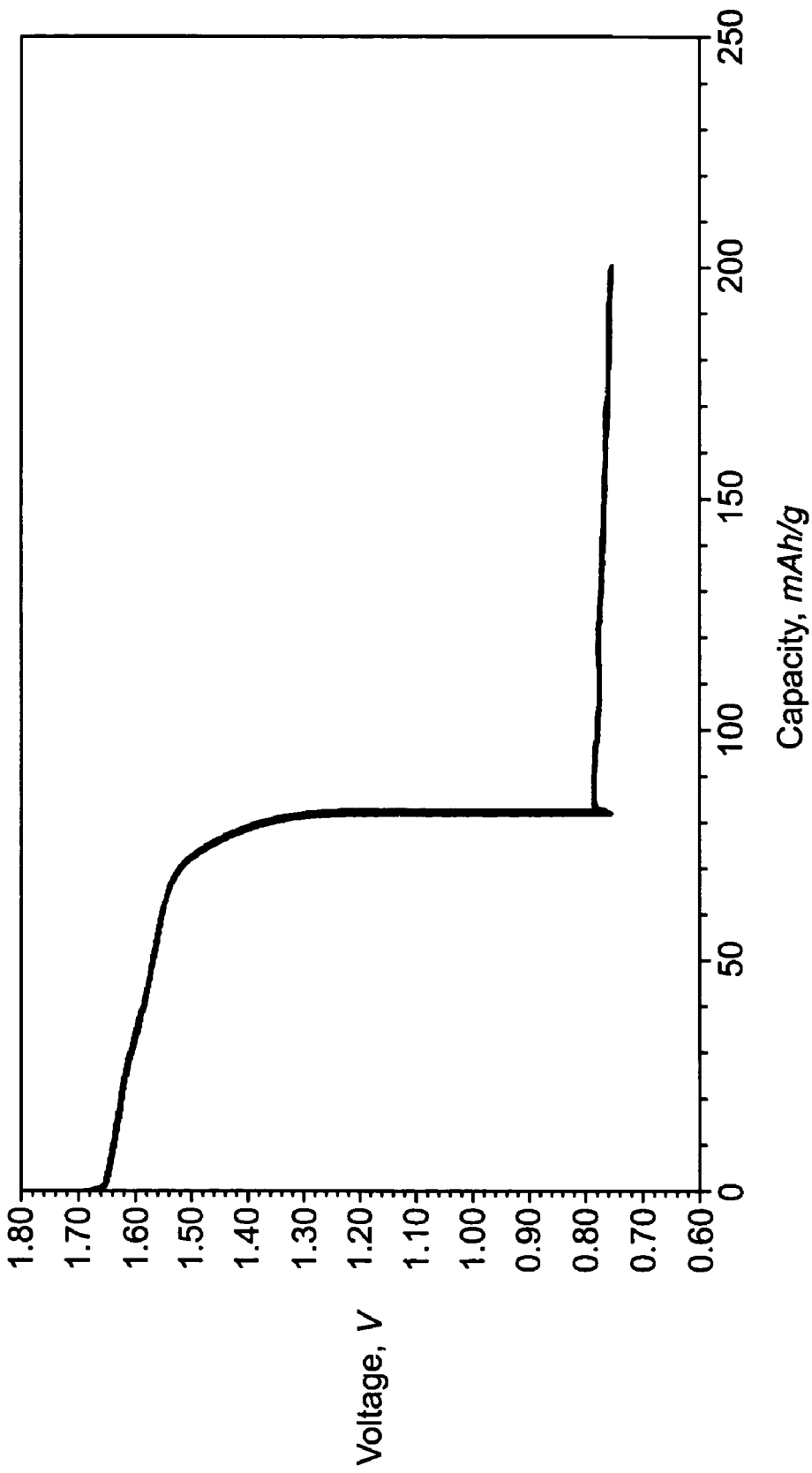

US 7,537,863 B2

PRIMARY ALKALINE BATTERY CONTAINING BISMUTH METAL OXIDE

CROSS-REFERENCE TO RELATED APPLICATIONS

This application is a continuation-in-part application of and claims priority to U.S. application Ser. No. 10/716,358, filed on Nov. 17, 2003, which claims priority under 35 U.S.C. § 119(e) to U.S. Provisional Patent Application Ser. No. 60/503,667, filed on Sep. 16, 2003. The entire contents of both applications are hereby incorporated by reference.

FIELD OF THE INVENTION

The invention relates to primary alkaline batteries.

BACKGROUND

Batteries, such as alkaline batteries, are commonly used as electrical energy sources. Generally, a battery contains a negative electrode (anode) and a positive electrode (cathode). The negative electrode contains an electroactive material (such as zinc particles) that can be oxidized; and the positive electrode contains an electroactive material (such as manganese dioxide) that can be reduced. The active material of the negative electrode is capable of reducing the active material of the positive electrode. In order to prevent direct reaction of the active material of the negative electrode and the active material of the positive electrode, the electrodes are mechanically and electrically isolated from each other by an ion-permeable separator.

When a battery is used as an electrical energy source for a device, such as a cellular telephone, electrical contact is made to the electrodes, allowing electrons to flow through the device and permitting the oxidation and reduction reactions to occur at the respective electrodes to provide electrical power. An electrolyte solution in contact with the electrodes contains ions that diffuse through the separator between the electrodes to maintain electrical charge balance throughout the battery during discharge.

SUMMARY

The invention relates to alkaline batteries, such as primary batteries, including bismuth.

In one aspect, the invention features a battery (e.g., a primary battery) including a cathode having an active material including an oxide containing one or more metals and pentavalent bismuth (i.e., $Bi^{5+}$), an anode, an ion-permeable separator between the cathode and the anode, and an alkaline electrolyte.

Primary batteries are meant to be discharged, e.g., to exhaustion, only once, and then discarded. Primary batteries are not intended to be recharged. In comparison, secondary batteries can be recharged many times, e.g., more than fifty times, more than a hundred times, or more.

The pentavalent bismuth-containing metal oxide is capable of enhancing overall battery performance. For example, alkaline cells with cathodes including the pentavalent bismuth-containing metal oxide are capable of providing high energy (e.g., high theoretical volumetric energy densities) and substantial total discharge capacity at commercially useful average running voltages of between 1.4 and 1.7 V (e.g., at low discharge rates). The cells can have relatively flat discharge voltage profiles suitable for powering certain digital electronic devices such as, digital cameras, and powered consumer products, for example, toothbrushes and razors. The cells can have good discharge performance after an extended period of storage. The pentavalent bismuth-containing metal oxides also are stable and can provide good cathode utilization (e.g., at high or low discharge rates). The cathode active material can be incorporated into cylindrical alkaline batteries of different sizes (e.g., AA, AAA, AAAA, C, D) as well as into batteries having other form-factors, such as button cells, coin cells, prismatic or flat batteries, and flexible pouch, envelope or bag cells in a cost effective manner. Many bismuth-containing compounds have low toxicity and benign environmental impact, so the manufacture and disposal of batteries containing pentavalent bismuth-containing metal oxides can raise relatively few health and environmental concerns.

In another aspect, the invention features a battery including a cathode having an oxide containing an alkali metal and pentavalent bismuth, the alkali metal being lithium or potassium, an anode, a separator between the cathode and the anode, and an alkaline electrolyte. The oxide can be, for example, $LiBiO_3$, $Li_3BiO_4$, $Li_5BiO_5$, $Li_7BiO_6$, $Li_6KBiO_6$, $Li_4Bi_2O_7$, $Li_5Bi_3O_{10}$ or $KBiO_3$.

In another aspect, the invention features a battery including a cathode having an oxide containing an alkaline earth metal and pentavalent bismuth, an anode, a separator between the cathode and the anode, and an alkaline electrolyte. The alkaline earth metal can be magnesium, calcium, strontium, or barium. The oxide can be, for example, $MgBi_2O_6$, $SrBi_2O_6$, $Sr_2Bi_2O_7$, $LiSr_3BiO_6$, $NaSr_3BiO_6$, $Ba_2Bi_2O_6$ or $Li_2Ba_5Bi_2O_{11}$.

In another aspect, the invention features a battery including a cathode having an oxide containing a metal and pentavalent bismuth, the metal being a main group metal, a lanthanide or a transition metal other than silver, an anode, a separator between the cathode and the anode, and an alkaline electrolyte.

The transition metal can be, for example, scandium, vanadium, manganese, iron, cobalt, nickel, copper, zinc, yttrium, zirconium, niobium, molybdenum, ruthenium, palladium, cadmium, tantalum, or tungsten. The lanthanide can be, for example, lanthanum, cerium, neodymium, samarium, europium, gadolinium, terbium, dysprosium, holmium, erbium, thulium, or ytterbium. The main group metal can be, for example, indium, tin, antimony or lead. Examples of oxides include $ZnBi_2O_6$, $Cu_2Bi_2O_7$, $CdBi_2O_6$, and $Sr_2ScBiO_6$.

Embodiments of the above aspects may include one or more of the following features. The oxide can include an electrically conductive portion, such as an electrically conductive surface coating including carbon or a conductive metal oxide. The anode includes zinc. The electrolyte includes lithium hydroxide, sodium hydroxide, and/or potassium hydroxide. The electrolyte can further include soluble additives, such as barium hydroxide, barium fluoride, aluminum hydroxide, and zinc oxide. The separator is capable of preventing soluble bismuth species from diffusing from the cathode to the anode. The separator also can be capable of trapping soluble bismuth species.

In another aspect, the invention features methods of decreasing solubility of cathode active materials (e.g., a pentavalent bismuth-containing metal oxide) in alkaline electrolyte, e.g., to reduce deleterious effects on cell performance from soluble bismuth species from the cathode. The method can improve electrochemical performance and storage life of the cell.

Other aspects, features, and advantages of the invention will be apparent from the drawings, description, and claims.

DESCRIPTION OF THE DRAWINGS

FIG. 2 is a table showing theoretical gravimetric capacities, volumetric capacities and volumetric energy densities of selected primary alkaline zinc cells containing pentavalent bismuth-containing metal oxides having a nominal 1.5 V average running voltage.

FIG. 3 is a table showing chemical compositions of selected pentavalent bismuth-containing metal oxides as determined by inductively coupled plasma spectroscopic analysis.

FIG. 7 is a table showing gravimetric specific capacities of alkaline button cells with cathodes containing uncoated and CoOOH-coated bismuth-containing metal oxides discharged to 0.6V and 0.8V cutoff voltages.

FIG. 16 is a discharge curve at a constant rate of nominally 10 mA/g for cobalt oxyhydroxide-coated $SrBi_2O_6$ in an alkaline button cell discharged to a 0.6 V cutoff voltage.

DETAILED DESCRIPTION OF THE PREFERRED EMBODIMENTS

Figure 1:
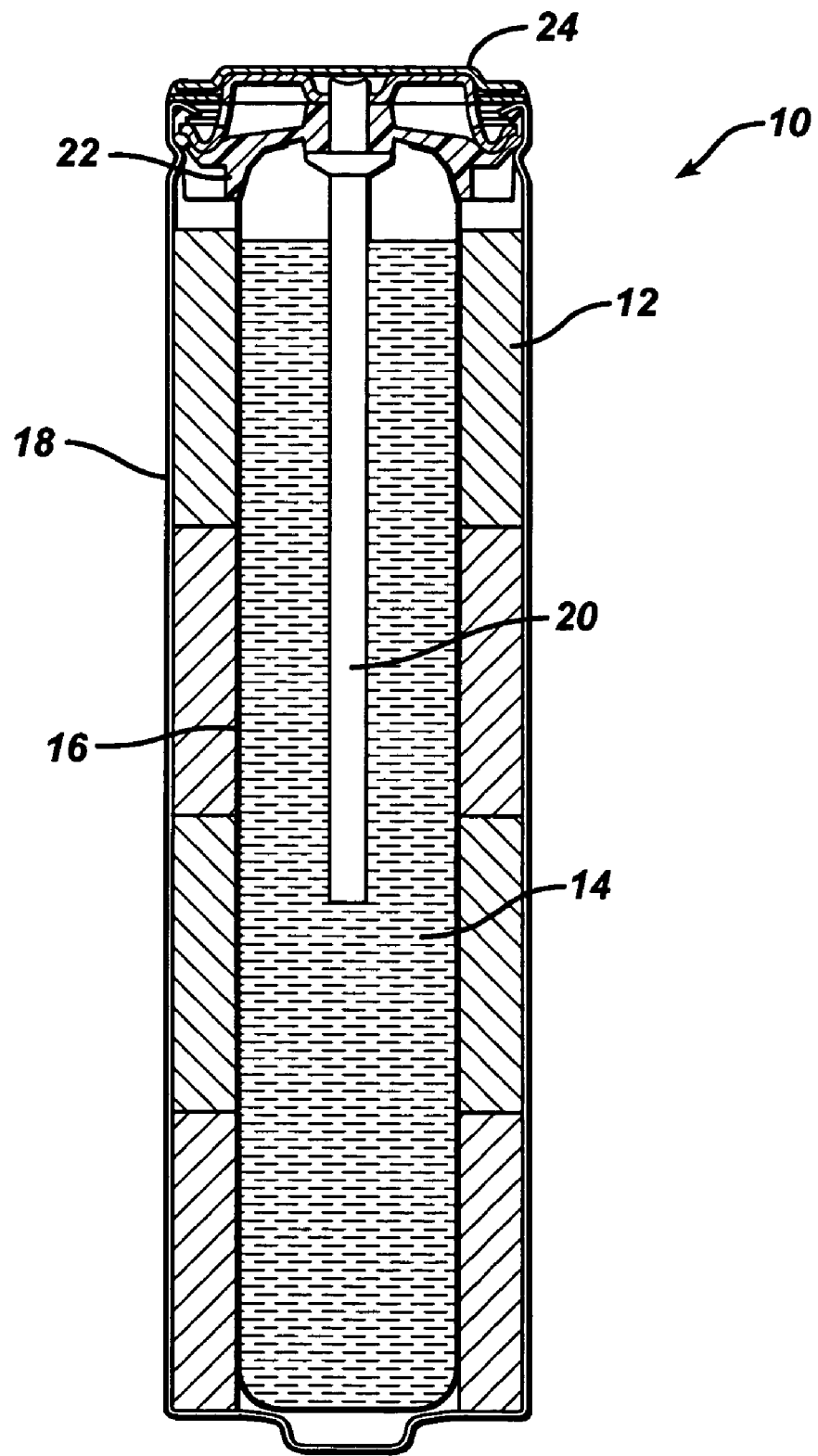
FIG. 1 is a side-sectional view of a battery.

Referring to FIG. 1, a battery 10 includes a cylindrical housing 18, a cathode 12 in the housing, an anode 14 in the housing, and a separator 16 between the cathode and the anode. Battery 10 also includes a current collector 20, a seal 22, and a metal top cap 24, which serves as the negative terminal for the battery. Cathode 12 is in contact with housing 18, and the positive terminal of battery 10 is at the opposite end of battery 10 from the negative terminal. An electrolyte solution, e.g., an alkaline solution, is dispersed throughout battery 10.

Cathode 12 includes an electrochemically active material having a pentavalent bismuth-containing metal oxide, an electrically conductive additive, and optionally, a binder.

In particular, the pentavalent bismuth-containing metal oxide, sometimes called a "bismuthate", is generally a complex oxide containing pentavalent bismuth, i.e., $Bi^{5+}$, optionally, trivalent bismuth, i.e., $Bi^{3+}$ as a minor constituent (e.g., less than about 50 atomic percent) and one or more metals. For example, of the bismuth in a chemical formula unit of the complex metal oxide, at least about 50 atomic percent (e.g., at least about 60, 70, 80, or 90 atomic percent) is formally pentavalent bismuth. Pentavalent bismuth-containing metal oxides are capable of providing battery 10 with high volumetric energy density (e.g., the theoretical volumetric energy density can be higher than commercial alkaline zinc primary cells including $MnO_2/Zn$, β-NiOOH/Zn or $Ag_2O/Zn$) and having a commercially useful average running voltage range (e.g., a closed circuit voltage, CCV, of from about 1.4 to 1.7 V (FIG. 2)). In embodiments, the pentavalent bismuth-containing metal oxides can have low solubility, for example, less than about 70 ppm, less than about 40 ppm, or less than about 10 ppm at room temperature, in an alkaline electrolyte. As a result, battery 10 can have good ambient shelf life. The pentavalent bismuth-containing metal oxides also can be thermally stable in air to a temperature greater than about 200° C. (e.g., greater than about 300° C.). It is believed that the good thermal stability of the pentavalent bismuth-containing metal oxides is indicative of the structural stability of the crystallographic lattice structure of the oxides and the chemical stability of the oxides in the presence of electrolyte and other materials included in the battery. The pentavalent bismuth-containing metal oxides can have rutile, trirutile, fluorite, pyrochlore, ilmenite, pyrochlore-related, perovskite-type or other related crystallographic lattice structures. As discussed below, the metal of the pentavalent bismuth-containing metal oxide can be an alkali metal, an alkaline earth metal, a transition metal, a lanthanide, and/or a main group metal or a mixture thereof.

In embodiments in which the pentavalent bismuth-containing metal oxide includes an alkali metal, the metal can be lithium, sodium, potassium, rubidium and/or cesium. Examples of pentavalent bismuth metal oxides including an alkali metal include $MBiO_3$, $M_3BiO_4$, $M_7BiO_6$, $M_4Bi_2O_7$, $M_5Bi_3O_{10}$, where M can be Li, Na, K, Rb, and/or Cs; $Li_5BiO_5$; and $Li_6KBiO_6$. Syntheses of alkali metal pentavalent bismuth-containing oxides are described, for example, in J. Trehoux et al., *Mater. Res. Bull.*, 17, 1235-43 (1982); E. Nomura et al., *J. Solid State Chem.*, 52, 91-3 (1984); C. Greaves et al., *Mater. Res. Bull.*, 24, 973-980 (1989); S. Kodialam et al., *Mater. Res. Bull.*, 27, 1379-1384 (1992); T. N. Nguyen et al., *Chem. Mater.*, 5(9), 1273-6 (1993); B. K. Kasenov et al., *Zhur. Fiz. Khim.*, 71(6), 1146-8 (1997); and N. Kumada et al., *J. Solid State Chem.*, 126, 121-6 (1996); *Mater. Res. Bull.*, 32(8), 1003-1009 (1997). Any of the pentavalent bismuth-containing metal oxides can include more than one type of alkali metal, in any combination, for example, by ion substitution or ion exchange. Some examples include $Li_{1-x}Na_xBiO_3$ and $Na_{1-x}K_xBiO_3$, where $0<x<1$; $KLi_6BiO_6$; and $RbLi_6BiO_6$. The pentavalent bismuth-containing alkali metal oxides can be stoichiometric or non-stoichiometric, and can include trivalent bismuth as a minor constituent, e.g., less than about 50 atomic percent, 30 atomic percent, or 10 atomic percent. Syntheses of mixed alkali metal pentavalent bismuth-containing oxides are described, for example, in R. Huebenthal & R. Hoppe, *Acta Chem. Scand.*, 45(8), 805-811 (1991); and V. A. Carlson & A. M. Stacy, *J. Solid State Chem.*, 96, 332-343 (1992).

In embodiments in which the pentavalent bismuth-containing metal oxide includes an alkaline earth metal, the metal can be magnesium, calcium, strontium, and/or barium. Examples of alkaline metal bismuth oxides include $MgBi_2O_6$, $SrBi_2O_6$, $Sr_2Bi_2O_7$, $LiSr_3BiO_6$, $NaSr_3BiO_6$, $Ba_2Bi_2O_6$ or $Li_2Ba_5Bi_2O_{11}$. Syntheses of alkaline earth metal pentavalent bismuth-containing oxides are described, for example, in K. Kumada et al., *Mater. Res. Bull.*, 32, 1003-8 (1997); K. Kumada et al., *Solid State Ionics*, 122, 183-9(1999); D. E. Cox & A. W. Sleight, *Solid State Commun.*, 19, 969-973 (1976); and O. Knop et al., *Can. J Chem.*, 58, 2221-4 (1980). In some cases, for example, alkaline earth bismuth oxides such as perovskite-related $Ba_2Bi_2O_6$, the bismuth can have mixed valence, e.g., having both $Bi^{5+}$ and $Bi^{3+}$ species present. As with the alkali metal pentavalent bismuth-containing oxides, any of the alkaline earth metal pentavalent bismuth-containing oxides can include more than one type of alkaline earth metal or a combination of one or more alkali metals and one or more alkaline earth metals, in any combination. Some examples include $Ba_{1-x}K_xBiO_3$ and $Sr_{1-x}K_x$-$BiO_3$ (which also contain mixed valence bismuth, e.g., $Ba_{0.6}K_{0.4}BiO_3$), $LiSr_3BiO_6$, and $Li_2Ba_5Bi_2O_{11}$. The alkaline earth bismuth oxides can be stoichiometric or non-stoichiometric, and can include trivalent bismuth as a minor constituent. Syntheses of mixed alkali metal and alkaline earth metal pentavalent bismuth-containing oxides are described, for example, in A. W. Sleight et al., *Solid State Commun.*, 17, 27-8 (1975); *J. Solid State Chem.*, 78, 319 (1989); M. L. Norton, *Mater. Res. Bull.*, 24, 1391-7 (1989); S. F. Liu & W. T. Fu, *Mater. Res. Bull.*, 36, 1505-12(2001); and V. A. Carlson & A. M. Stacy, *J. Solid State Chem.*, 96, 332-343 (1992).

The pentavalent bismuth-containing metal oxide can include one or more transition metals and/or one or more main group metals. The transition metal can be a first row transition metal (e.g., Sc, V, Mn, Fe, Co, Ni, Cu, or Zn), a second row transition metal (e.g., Y, Zr, Nb, Mo, Ru, Pd, Ag or Cd) or a third row transition metal (e.g., Ta, W). Examples of pentavalent bismuth-containing transition metal oxides include $ZnBi_2O_6$, $Cu_2Bi_2O_7$, $CdBi_2O_6$, $AgBiO_3$, $Ag_{25}Bi_3O_{18}$, $Ba_2YBiO_6$, $Sr_2ScBiO_6$, $Sr_{18}Ru_{1.9}Bi_{4.1}O_{33}$, and $Li_8PdBi_2O_{10}$. Syntheses of transition metal pentavalent bismuth-containing oxides are described, for example, in N. Kumada et al., *Mater. Res. Bull.*, 32, 1003-8 (1997); *Adv. Ion-Exchange for Industry Research*, 239, 212-217 (1999); *Mater. Res. Bull.*, 35(2), 2397-2402 (2000); H. Mizoguchi et al., *Chem. Commun.*, (9), 1084-5 (2003); M. Bortz & M. Jansen, *Z. Anorg. Allgem. Chem*, 612, 113-7 (1992); M. S. Martin-Gonzalez et al., *J. Solid State Chem.*, 173, 203-8 (1993); and Y. Laligant & A. LeBail, *Euro. J Solid State Inorg. Chem.*, 30, 689-698 (1993). The transition metal can be a lanthanide (e.g., La, Ce, Pr, Nd, Sm, Eu, Gd, Th, Dy, Ho, Er, Tm or Yb). Examples of pentavalent bismuth-containing lanthanide oxides include $Ba_2LaBiO_6$ and $Sr_2NdBiO_6$. Syntheses of pentavalent bismuth-containing lanthanide oxides are described, for example, in H. Mizoguchi et al., *Chem. Commun.*, (9), 1084-5 (2003); and A. Lenz & H. Mueller-Buschbaum, *J. Less Common Metals*, 161(1), 141-6 (1990). The main group metal can be, for example, In, Sn, Pb or Sb. Examples of pentavalent bismuth-containing main group oxides include $Ba_2InBiO_6$ and $BaBi_{1-x}Pb_xO_3$. Syntheses of pentavalent bismuth-containing main group metal oxides are described, for example, in W. T. Fu et al., *Mater. Res. Bull.*, 35, 1205 (2000); and A. W. Sleight et al., *Solid State Commun.*, 17, 27 (1975). As with the pentavalent bismuth-containing metal oxides described above, the pentavalent bismuth-containing transition metal oxides, lanthanide oxides, or main group metal oxides can include more than one type of metal, in any combination. The pentavalent bismuth-containing metal oxides can be stoichiometric or non-stoichiometric, and also can contain mixed valent bismuth, e.g., both $Bi^{5+}$ and $Bi^{3+}$ species can be present.

In some embodiments, the pentavalent bismuth-containing metal oxide cathode materials are capable of being reduced, e.g., to bismuth metal, during discharge without consuming water from the electrolyte solution. For example, referring to Equations 1-8 below, $ZnBi_2O_6$ is capable of undergoing reduction in two steps. The first step (Equation 1) is a two-electron per bismuth reduction to $Bi_2O_3$, and the second step (Equation 5), a three-electron per bismuth reduction to Bi metal.

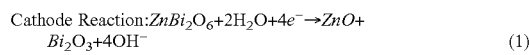

Cathode Reaction:$ZnBi_2O_6 + 2H_2O + 4e^- \rightarrow ZnO + Bi_2O_3 + 4OH^-$ (1)

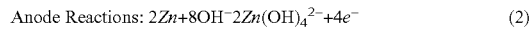

Anode Reactions: $2Zn + 8OH^- \rightarrow 2Zn(OH)_4^{2-} + 4e^-$ (2)

$2Zn(OH)_4^{2-} \rightarrow 2ZnO + 4OH^- + 2H_2O$ (3)

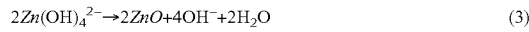

Net Reaction:$ZnBi_2O_6 + 2Zn \rightarrow 3ZnO + Bi_2O_3$ (4)

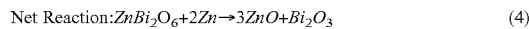

Cathode Reaction:$Bi_2O_3 + 3H_2O + 6e^- \rightarrow 2Bi^0 + 6OH^-$ (5)

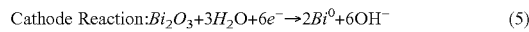

Anode Reactions: $3Zn + 12OH^- \rightarrow 3Zn(OH)_4^{2-} + 6e^-$ (6)

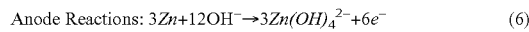

$3Zn(OH)_4^{2-} \rightarrow 3ZnO + 6OH^- + 3H_2O$ (7)

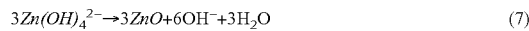

Net Reaction:$Bi_2O_3 + 3Zn \rightarrow 3ZnO + 2Bi^0$ (8)

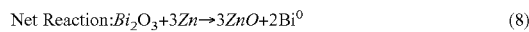

The net cell discharge reactions are shown in Equations 4 and 8. Since water is not consumed in either net cell discharge reaction, the total amount of water included in battery 10 (e.g., in the electrolyte) can be decreased without comprising performance. As a result, additional electrode active material can be added to cathode 12 and/or anode 14 in battery 10, thereby increasing total discharge capacity. In some embodiments, cathode 12 includes between about 50 percent and about 95 percent by weight, for example, between about 60 percent and about 90 percent by weight, or between about 70 percent and about 85 percent by weight, of the cathode active material by weight. Cathode 12 can include greater than or equal to about 50, 60, 70, 80, or 90 percent by weight, and/or less than or equal to about 95, 90, 80, 70, or 60 percent by weight of the cathode active material. Cathode 12 can include one or more (e.g., two, three or more) of the above pentavalent bismuth-containing metal oxides, in any combination. For example, cathode 12 can include a mixture of $KBiO_3$, $MgBi_2O_6$, and/or $ZnBi_2O_6$.

One or more pentavalent bismuth-containing metal oxides can make up all of the active material of cathode 12, or a portion of the active material of cathode 12. For example, as the active material of cathode 12, the pentavalent bismuth-containing metal oxide(s) can be mixed with manganese dioxide (e.g., electrolytically-synthesized γ-$MnO_2$ (EMD), or chemically-synthesized γ-$MnO_2$ (CMD) or a blend of EMD and CMD). The manganese dioxide can be EMD having a high power coefficient, as described in U.S. Pat. No. 6,509,117, hereby incorporated by reference in its entirety. The pentavalent bismuth-containing metal oxides can enhance the average running voltage and/or the volumetric energy density of the manganese oxide-containing battery. In addition, because the pentavalent bismuth-containing metal oxides can have substantially higher true densities than EMD and do not consume water during discharge unlike EMD, the volumetric capacities of alkaline cells containing pentavalent bismuth-containing metal oxides can be substantially greater than that of alkaline cells containing EMD. In some cases, for example, the specific discharge capacity above about 0.8 V of alkaline cells containing the pentavalent bismuth-containing metal oxides as additives can be increased substantially compared to cells containing EMD as the sole active cathode material. Moreover, cathode utilization (e.g., below about 0.8 V) for alkaline cells containing the pentavalent bismuth-containing metal oxides as additives can be increased because of the formation of metallic Bi from reduction of $Bi_2O_3$ during cell discharge. In a cathode including a mixture of active materials, the pentavalent bismuth-containing metal oxides can make-up between greater than about one percent to less than about 100 percent by weight of the active materials. For example, cathode 12 can include greater than or equal to about 0%, 10%, 20%, 30%, 40%, 50%, 60%, 70%, 80%, or 90% by weight of pentavalent bismuth-containing metal oxide(s); and/or less than or equal to about 100%, 90%, 80%, 70%, 60%, 50%, 40%, 30%, 20%, or 10% by weight of pentavalent bismuth-containing metal oxide(s). Other examples of cathode active materials that can be used in combination with pentavalent bismuth-containing metal oxide(s) include β-NiOOH, γ-NiOOH, AgO, $Ag_2O$, $AgNiO_2$, $AgCoO_2$, and $BaFeO_4$.

The pentavalent bismuth-containing metal oxide can be semiconducting, such as $MgBi_2O_6$, $ZnBi_2O_6$, and $Ba_2InBiO_6$, for example. In some embodiments, the pentavalent bismuth-containing metal oxide can be a degenerate n-type semiconductor, such as $MgBi_2O_6$ and $ZnBi_2O_6$ as described in H. Mizoguchi et al., *Chem. Commun.*, (9), 1084-5 (2003).

In some embodiments, to enhance its bulk electrical conductivity, the pentavalent bismuth-containing metal oxide particles can include an electrically conductive portion, e.g., a surface coating that enhances inter-particle electrical conductivity. The conductive surface coating also can serve to enhance the total discharge capacity and/or the average running voltage of battery 10 (e.g., at low discharge rates), as well as enhance the effective cathode utilization (e.g., at high and low discharge rates). The conductive coating can also enhance the stability of the cathode material in the electrolyte, e.g., by serving as a protective layer during storage at elevated temperatures. The conductive surface coating can include a carbonaceous material, such as graphite (natural or synthetic), carbon black, and/or acetylene black. Additionally or alternatively, the conductive surface coating can include a metal, such as gold or silver, and/or a conductive or semiconductive metal oxide, such as cobalt oxide (e.g., $CO_3O_4$), cobalt oxyhydroxide, silver oxide, silver nickel oxide, silver bismuth oxide, nickel oxyhydroxide, indium oxide or indium tin oxide. The conductive layer can include a nanoparticulate conductive metal oxide. The conductive layer also can include one or more optional dopants, for example, sodium. The conductive surface coating can be applied or deposited, for example, using solution techniques including precipitation and subsequent chemical oxidation, electrodeposition, electroless deposition or by vapor phase deposition (e.g., sputtering, physical vapor deposition, or chemical vapor deposition). A conductive coating thickness can be provided by applying the conductive material at a level of about 2-15 percent by weight (e.g., greater than or equal about 2, 3, 4, 5, 6, 7, 8, 9, 10, 11, 12, 13, or 14 percent by weight, and/or less than or equal to about 15, 14, 13, 12, 11, 10, 9, 8, 7, 6, 5, 4, or 3 percent by weight) relative to the total weight of the pentavalent bismuth-containing metal oxide. The conductive layer can cover at least 60%, at least 75%, at least 90% of the surface of the $Bi^{5+}$-containing complex metal oxide.

In addition, as indicated above, cathode 12 can include one or more electrically conductive additives capable of enhancing the bulk electrical conductivity of cathode 12. Examples of conductive additives include natural or non-synthetic graphite, oxidation-resistant natural or non-synthetic graphite, synthetic graphite, oxidation-resistant synthetic graphite, highly graphitized carbon blacks, gold powder, cobalt oxides, e.g., cobalt oxyhydroxide, and/or carbon nanofibers. In certain embodiments, the graphite particles are nonsynthetic, nonexpanded graphite particles available from, for example, Brazilian Nacional de Grafite, Itapecirica, MG Brazil (e.g., MP-0702X). In other embodiments, the graphite particles are synthetic, non-expanded graphite particles, available from, for example, Timcal, Ltd., Bodio, Switzerland (e.g., Timrex® KS10, KS15, KS25). In embodiments, the conductive additive is strongly resistant to oxidation by a $Bi^{5+}$-containing metal oxide cathode material, which can have an oxidation potential that is capable of directly oxidizing the additive during storage of the cell, particularly during storage at elevated temperatures. Oxidation of graphite can decrease bulk cathode conductivity as well as form carbon dioxide that can react with the alkaline electrolyte to form potassium carbonate in solution. An increase in carbonate ion concentration can decrease ionic conductivity of the electrolyte and increase polarization of the zinc anode thereby degrading cell performance. The graphite particles can be oxidation-resistant, synthetic or natural, non-expanded graphite particles.

Oxidation resistance of graphite can be determined by many contributing factors. For example, it is believed that the rate of graphite oxidation is at least partially related to the specific surface area of the graphite particles: the smaller the specific surface area, the more oxidation resistant the graphite. Similarly, oxidation resistance of graphite can be at least partially related to the average particle size as well as the particle size distribution. Because larger size particles typically have lower surface areas, they can be more oxidation resistant. In addition, graphite with a particle size distribution having a large fraction of small particles can be less oxidation-resistant than one having a smaller fraction of small particles. However, in embodiments, the average particle size is sufficiently small to form an efficient conductive network inside the cathode, in which the graphite particles can be in intimate contact with both $Bi^{5+}$-containing metal oxide particles and other graphite particles. An oxidation-resistant graphite can have an average particle size between about 3 and 30 microns, for example, between about 5 and 20 microns. Also, oxidation resistance is believed to be related at least partially to average crystallite size of the graphite particles. A graphite having a large average crystallite size (e.g., higher crystallinity) can exhibit good oxidation resistance. In embodiments, the average crystallite size (which can be determined by X-ray diffraction) is greater than about 2000 angstroms along the a-axis direction, $L_a$, and greater than about 1500 angstroms along the c axis direction, $L_c$. Further, it is believed that oxidation resistance also can depend at least partially on the relative number of surface defects or dislocations present in the graphite particles. An oxidation-resistant graphite can have relatively low levels of defects. In some embodiments, small graphite particles can have higher defect levels than larger particles of the same type graphite.

An oxidation-resistant graphite can be prepared by treating a high purity natural or synthetic, non-expanded graphite in an inert atmosphere at a high temperature, for example, greater than about 2500° C. or greater than about 3000° C. It is believed that by treating a high purity synthetic or natural graphite at a high graphitization temperature for an extended period of time, a graphite having a higher degree of crystallinity, a larger average crystallite size, fewer surface defects, a lower specific surface area, and a higher chemical purity (e.g., lower ash content) than the starting graphite can be produced. In some embodiments, the maximum ash content is less than about 0.1% by weight, for example, less than about 0.05% by weight.

Mixtures of conductive additives can be used, such as a mixture of graphite particles (e.g., including from about 10 to about 100 weight percent of oxidation-resistant graphite) and carbon nanofibers. Oxidation-resistant synthetic or natural graphites are available from, for example, Timcal, Ltd., Bodio, Switzerland (e.g., Timrex® SFG10, SFG15, SFG44, SLP30) or Superior Graphite Co., Chicago, Ill. (e.g., 2939 APH-M). Carbon nanofibers are described, for example, in commonly-assigned U.S. Ser. No. 09/658,042, filed Sep. 7, 2000, and U.S. Ser. No. 09/829,709, filed Apr. 10, 2001. Cathode 12 can include from about 5 to about 35 percent by weight of conductive additive. For example, cathode 12 can include greater than or equal to about 5, 10, 15, 20, 25, or 30 percent by weight of the conductive additive; and/or less than or equal to about 35, 30, 25, 20, 15, or 10 percent by weight of the conductive additive.

An optional binder can be added to enhance the structural integrity of cathode 12. Examples of binders include polyethylene powders, polyacrylamides, Portland cement, and various fluorocarbon resins, such as polyvinylidenefluoride (PVDF) and polytetrafluoroethylene (PTFE). An example of a polyethylene binder is sold under the tradename Coathylene HA-1681 (available from Hoescht). Cathode 12 can include, for example, from about 0.1 percent to about 2 percent by weight of binder. Cathode 12 also can include other optional additives. For example, addition of small amounts (e.g., about 0.01 to about 1 weight percent) of a fluoride salt, e.g., potassium fluoride or barium fluoride, to the cathode can improve cathode utilization.

The electrolyte solution also is dispersed throughout cathode 12, e.g., at about 5-7 percent by weight. Weight percentages provided herein are determined after the electrolyte solution is dispersed in cathode 12. The electrolyte solution can be any of the electrolyte solutions commonly used in alkaline batteries. The electrolyte solution can be an alkaline solution, such as an aqueous alkali metal hydroxide solution, e.g., LiOH, NaOH, KOH, or mixtures of alkali metal hydroxide solutions (e.g., KOH and NaOH, KOH and LiOH). For example, the aqueous alkali metal hydroxide solution can include between about 20 and about 45 percent by weight of the alkali metal hydroxide, such as about 7 N KOH and 9 N KOH (i.e., about 30 and 37 percent by weight KOH), and 40/2 KOH electrolyte (i.e., about 35 percent by weight KOH). In some embodiments, the electrolyte solution also can include up to about 6 percent by weight zinc oxide, e.g., about 2 percent by weight zinc oxide.

In some embodiments, the electrolyte solution is formulated such that dissolution of cathode active material in the electrolyte is reduced. In strongly alkaline electrolyte solutions, for example, 7N KOH or 9N KOH, some $Bi^{5+}$-containing complex metal oxide cathode active materials can dissolve and/or be unstable to decomposition to $Bi^{+3}$-containing materials. Some of the $Bi^{5+}$-containing complex metal oxides are somewhat soluble (e.g., <800 ppm Bi by weight) even at ambient temperature in 9N KOH electrolyte solution. Without wishing to be bound by theory, it is believed that the $Bi^{5+}$-containing complex metal oxides typically do not oxidize the electrolyte, but instead can undergo an ion-exchange process, e.g., with a KOH electrolyte. In the case of $MgBi_2O_6$ and $ZnBi_2O_6$, for example, both magnesium and zinc ions can be exchanged completely by potassium ions to form another $Bi^{5+}$-containing compound, potassium bismuthate (e.g., $KBiO_3$). Even though the solubility of $KBiO_3$ can be substantially less than that of some un-exchanged $Bi^{5+}$-containing complex metal oxide cathode materials, the theoretical volumetric capacity (i.e., $Ah/cm^3$) of $KBiO_3$ is only about 75% that of the un-exchanged $MgBi_2O_6$ and $ZnBi_2O_6$ cathode materials.

Other deleterious effects can occur as a result of the dissolution of the cathode active material. For example, dissolution of the cathode active material is in effect a cathode self-discharge process that can diminish total cell capacity. Dissolution of highly oxidized transition metal species can build up inside the cell and can result in leakage. Further, the dissolved metal ions can diffuse to the zinc anode where they can be chemically reduced by zinc and deposited on the surface of the zinc as metallic particles, e.g., bismuth. The zinc anode can be oxidized and, in effect, undergo self-discharge, which can further diminish the total capacity of a balanced cell, sometimes more quickly than by cathode self-discharge processes because reduction of a highly oxidized metal species to its metallic state can consume more equivalents of zinc than would be consumed during normal cell discharge. This anode self-discharge process can cause an increase in hydrogen gassing rate since the metal, e.g., bismuth, deposited on the surface of the zinc particles can result in a lower hydrogen over-potential than pure zinc. A larger volume of hydrogen gas can be evolved than typically would be expected from the zinc anode in the absence of dissolved highly oxidized metal species, which can lead to cell leakage. The metal particles formed on the zinc particles can deposit so as to form dendrites that can grow outwardly from the surface of the zinc particles toward the cathode, penetrate the separator, and cause an internal short-circuit in the cell. As a result, shelf life of an alkaline cell having a soluble cathode active material can be severely degraded, especially during storage at elevated temperatures.

Accordingly, the electrolyte can contain one or more soluble additives to decrease solubility of the electroactive cathode material in the electrolyte. Without wishing to be bound by theory, it is believed that the additive is capable of reducing (e.g., suppressing) ion exchange of metal ions in the cathode active material by potassium ions of the electrolyte, thereby suppressing formation of $KBiO_3$, inhibiting dissolution of the cathode active material, and limiting the concentration of $Bi^{5+}$ species in the electrolyte. As a result, the overall stability of a $Bi^{5+}$-containing complex metal oxide cathode material in contact with a KOH-containing electrolyte at elevated temperatures as well as the discharge performance of the cell, e.g., after storage, can be enhanced.

The soluble additive can be an alkali metal compound, an alkaline earth metal compound, a transition metal compound, a main group metal compound, a lanthanide compound, or a mixture thereof. Potassium fluoride is an example of an alkali metal compound. Examples of alkaline earth metal compounds include salts and oxides, such as magnesium fluoride, barium hydroxide, barium oxide, barium fluoride, barium carbonate, barium sulfate, strontium hydroxide, strontium oxide, strontium fluoride, calcium hydroxide, calcium oxide, calcium fluoride, and mixtures thereof. Barium hydroxide in the electrolyte also can serve to decrease hydrogen gassing by the zinc anode during storage, e.g., at elevated temperatures. Examples of lanthanide compounds include lanthanum hydroxide, lanthanum oxide, cerium hydroxide, praseodymium hydroxide, neodymium hydroxide, and europium hydroxide. Zinc oxide is an example of a transition metal compound additive. Examples of main group metal compounds include aluminum hydroxide, aluminum oxide, gallium hydroxide, gallium oxide, indium hydroxide, indium oxide, indium oxyhydroxide, and bismuth hydroxide. Addition of barium fluoride to an alkaline electrolyte solution (e.g., 6M KOH+0.6M LiOH) at a concentration of from about 0.0001 to 0.001M can improve cycle life and cycling efficiency, e.g., as disclosed in U.S. Pat. 5,681,672 for rechargeable alkaline nickel-zinc cells. Addition of potassium fluoride alone (e.g., 18 to 30 weight percent) or a combination of potassium fluoride (e.g., about 0.5 to 4M) and potassium carbonate (e.g., about 0.5 to 4M) to an alkaline electrolyte solution (e.g., 3M KOH +0.5M LiOH) can improve capacity retention and high rate performance, e.g., as disclosed in U.S. Pat. Nos. 4,247,610 and 5,302,475 for rechargeable alkaline nickel-zinc cells.

The soluble additive(s) can be included in cathode 12, in the electrolyte, and/or in anode 14, in any combination. For example, the additive(s) can be included in the form of a solid, a solution (e.g., a saturated solution), or in both forms. In some embodiments, the electrolyte is saturated with the additive(s). The saturation concentration of the electrolyte additive depends upon the particular additive as well as the concentration of the electrolyte. For example, the saturation concentration of barium hydroxide in 9N KOH electrolyte solution can be about 6200 ppm Ba by weight after 10 days at 60° C. whereas that of barium fluoride can be about 1265 ppm Ba by weight. By comparison, the saturation concentration of aluminum hydroxide in 7N KOH electrolyte solution can be about 13 percent by weight (e.g., as $Al_2O_3$). However, a high concentration of aluminum hydroxide can increase viscosity of the electrolyte solution resulting in a substantial decrease in ionic conductivity. For example, the ionic conductivity of a saturated solution of barium hydroxide in 9N KOH electrolyte at 20° C. can be about 0.53 Siemens/cm, whereas the ionic conductivity of a saturated solution of aluminum hydroxide in 7N KOH electrolyte can be about 0.19 Siemens/cm. For comparison, the ionic conductivity of 9N KOH electrolyte at 20° C. without any additive can be about 0.58 Siemens/cm.

Anode 14 can be formed of any of the standard zinc materials used in alkaline battery anodes. For example, anode 14 can be a gel that includes zinc metal particles and/or zinc alloy particles, a gelling agent, and minor amounts of additives, such as a gassing inhibitor. In addition, a portion of the electrolyte solution is dispersed throughout the anode.

The zinc particles can be any of the zinc particles used in gelled zinc anodes. Examples of zinc particles include those described in U.S. Pat. Nos. 6,284,410; 6,472,103; 6,521,378; and commonly-assigned U.S. Ser. No. 10/29,575 and U.S. Ser. No. 10/113,075, all hereby incorporated by reference. The anode may include, for example, by weight between about 60% and about 80%, between about 62% and 75%, between about 62% and about 72%, or between about 67% and about 71% of zinc particles.

The zinc-based particles can further include zinc fines, e.g., mixed with zinc particles having a larger mean average particle size. As used herein, zinc fines include zinc-based particles small enough to pass through a 200 mesh size sieve (or a sieve having square openings of 0.075 mm). The –200 mesh zinc fines can have a mean average particle size between about 1 and 75 microns. Zinc fines can further include zinc-based particles small enough to pass through a 325 mesh size sieve (or a sieve having square openings of 0.045 mm). The –325 mesh zinc fines can have a mean average particle size between about 1 and 35 microns. The anode can include at least 10 weight percent, at least 15 weight percent, at least 30 weight percent, or at least 80 weight percent, of the total zinc-based particles in the form of zinc fines. Even very small amounts of zinc fines, for example, at least about 5 weight percent, or at least about 1 weight percent of the total zinc-based particles can have a beneficial effect on anode performance. The total zinc-based particles in the anode can consist of only zinc fines, of no zinc fines, or a mixture of zinc fines (e.g., between about 35 to about 75 weight percent) and larger size zinc particles. A mixture of zinc-based particles can provide good overall performance with respect to rate capability of the anode for a broad spectrum of drain rate requirements as well as provide good storage characteristics.

Examples of gelling agents include polyacrylic acids, grafted starch materials, salts of polyacrylic acids, polyacrylates, carboxymethylcellulose or combinations thereof. Examples of polyacrylic acids are Carbopol 940 and 934 (available from B.F. Goodrich) and Polygel 4P (available from 3V), and an example of a grafted starch material is Waterlock A221 (available from Grain Processing Corporation, Muscatine, Iowa). An example of a salt of a polyacrylic acid is Alcosorb G1 (available from Ciba Specialties). The anode may include, for example, from 0.1 percent to about 1 percent gelling agent by weight.

Gassing inhibitors can be inorganic materials, such as bismuth, tin, lead and indium included in alloys with zinc or soluble compounds, such as indium acetate, indium hydroxide, indium sulfate, bismuth oxide, and barium hydroxide, included in the anode. Alternatively, gassing inhibitors can be organic compounds, such as phosphate esters, ionic surfactants or nonionic surfactants. Examples of ionic surfactants are disclosed in, for example, U.S. Pat. No. 4,777,100, which is hereby incorporated by reference.

Separator 16 can have any of the designs for primary alkaline battery separators. In some embodiments, separator 16 can be formed of two layers of a non-woven, non-membrane material with one layer being disposed along a surface of the other. To minimize the volume of separator 16 while providing an efficient battery, each layer of non-woven, non-membrane material can have a basic weight of about 54 grams per square meter, a thickness of about 5.4 mils when dry and a thickness of about 10 mils when wet. In these embodiments, the separator may not include a layer of membrane material or a layer of adhesive between the non-woven, non-membrane layers. The layers can be substantially devoid of fillers, such as inorganic particles. In some embodiments, the separator can include inorganic particles.

In other embodiments, separator 16 can include an outer layer of cellophane and a layer of non-woven material. The separator also can include an additional layer of non-woven material. The cellophane layer can be adjacent to cathode 12. The non-woven material can contain from about 78 weight percent to about 82 weight percent polyvinylalcohol (PVA) and from about 18 weight percent to about 22 weight percent rayon and a trace amount of surfactant. Non-woven materials are available from PDM under the tradename PA25. An example of a separator including a layer of cellophane and a non-woven material is Duralam DT225 (Duracell Inc., Aarschot, Belgium).

Separator 16 can be an ion-permeable and an ion-selective separator. The ion-selective separator can include an ion-selective membrane or coating or a micro-porous membrane that can effectively limit the rate of diffusion of soluble bismuth-containing ionic species (e.g., $Bi^{3+}$ and $Bi^{5+}$-containing species such as, $BiO_3^{1-}$, $BiO_2^{1-}$, $Bi(OH)_4^{1-}$) through the separator during discharge and storage of the cell. Furthermore, in some embodiments, separator 16 can limit diffusion of soluble zincate ion, e.g., $[Zn(OH)_4]^{2-}$, from the anode to the cathode that can interfere with the reduction and oxidation of the cathode active material, thereby resulting in a loss of coulombic efficiency and ultimately in decreased shelf life. The separator can include a polymeric substrate having a wettable cellulose acetate-coated polypropylene microporous membrane (e.g., Celgard® 3559, Celgard® 5550, or Celgard® 2500) and an ion-selective coating applied to at least one surface of the substrate. Ion-selective coatings include polyaromatic ethers (such as a sulfonated derivative of poly(2,6-dimethyl-1,4-phenyleneoxide)) having a finite number of recurring monomeric phenylene units each of which can be substituted with one or more lower alkyl or phenyl groups and a sulfonic acid or carboxylic acid group. The separator also can include a substrate such as cellophane, nylon (e.g., Pellon® sold by Freundenburg, Inc.), a microporous polypropylene membrane (e.g., Celgard® 3559 sold by Celgard, Inc.) or a composite material including a dispersion of a carboxylic ion-exchange material in a microporous acrylic copolymer membrane (e.g., PD2193 sold by Pall-RAI, Inc.). Examples of separators are described in U.S. Pat. Nos. 5,798,180; 5,910,366; and 5,952,124.

An ion-selective separator can be a laminated sheet including multiple layers of ion-selective membranes including, for example, one or more cellophane layers, one or more grafted, low-density polyethylene microporous membranes, one or more grafted, high-density polyethylene microporous membranes, and/or one or more optional non-woven layers. An example of a multi-layer laminated separator includes a laminated separator consisting of a single cellophane layer laminated between two layers of grafted, high-density polyethylene microporous membranes (e.g., SLO-083; Shanghai ShiLong High-Tech Co., Ltd.). Ion-selective separators also can be used in combination with non-woven separators. Several different types of ion-selective laminated separator sheets can be used in combination stacked one overlying another. For example, a laminated separator sheet having a single cellophane layer laminated between two layers of a grafted, high-density polyethylene microporous membrane can be used in combination with a separator sheet having a layer of cellophane laminated to a layer of non-woven material, e.g., Duralam DT225. Laminated ion-selective separator sheets including multiple layers of cellophane and various types of polyethylene microporous membranes in various combinations and sequences are available commercially, for example, from Shanghai ShiLong High-Tech Co., Ltd. (Shanghai, P.R.C.).

In other embodiments, separator 16 can include one or more ion-trapping layers. The ion-trapping layer via a chemical reaction can convert a soluble bismuth ionic species into bismuth metal or another bismuth-containing species that is less soluble in the electrolyte. The layer can include inorganic particles, such as metal oxide nanoparticles, for example, $ZrO_2$ and $TiO_2$ that can form an insoluble compound or an insoluble complex with a soluble bismuth species (e.g., bismuthate, $BiO_3^{1-}$, $BiO_2^{1-}$, $Bi(OH)_4^{1-}$) to limit diffusion of soluble bismuth species through the separator to the anode. One or more ion-trapping layers can be used to sorb bismuth-containing ionic species in order to limit their diffusion into the zinc anode. Separators having one or more ion-selective layers can include one or more ion-trapping layers. Examples of adsorptive separators are disclosed in commonly assigned U.S. Ser. No. 10/682,740, filed on Oct. 9, 2003, and entitled "Separator for Battery", incorporated by reference in its entirety.

In some embodiments, separator 16 can include alkaline earth metal fluoride particles, for example, calcium fluoride, magnesium fluoride, strontium fluoride, and barium fluoride, that are essentially insoluble in alkaline electrolyte but are embedded in a regenerated cellulose film to dissolve slowly in the electrolyte to provide the electrolyte additive. Alkaline earth metal fluoride particles are disclosed in U.S. Pat. No. 6,682,854.

Separator 16 can include, in some embodiments, one or more non-microporous polymer-based solid gel membranes that contain ionic species within the gel's solution phase and that are conductive to anions or cations. For example, a membrane can include a polymer-based gel or film portion having an electrolyte in solution with the polymerization product of a polymerization initiator and one or more water-soluble ethylenically unsaturated amide or acid monomers, such as methylenebisacrylamide, acrylamide, methacrylic acid, acrylic acid, 1-vinyl-2-pyrrolidinone, or combinations thereof. Examples of electrolytes include potassium hydroxide, sodium hydroxide, lithium hydroxide, or combinations thereof. Alternatively or additionally, the ionic species may come from a neutral aqueous solution prepared from combinations of ammonium chloride, potassium sulfate, and/or sodium chloride. Separator 16 can include a reinforcing element, such as an ionic polymer, e.g., polysulfone (anionic) or poly(sodium-4-styrenesulfonate). The addition of the reinforcing element can enhancs the ionic conductivity and mechanical strength of the separator. In embodiments, a crosslinking agent, such as methylenebisacrylamide or ethylenebisacrylamide can also be used. Other embodiments of separator 16 and methods of making the separator are described in U.S. Pat. No.6,358,651. Separators are also commercially available from eVionyx, Inc. (Hawthorne, N.Y.).

In general, separator 16 can include any one or more layers or separator sheets described above, in any combination. The total thickness and composition of the resulting multi-layer separator stack can be selected to provide sufficiently low resistivity (e.g., impedance) to minimize degradation of cell performance at high discharge rates.

Cell housing 18 can be any housing used for primary alkaline batteries. The housing can include an inner metal wall and an outer electrically non-conductive material such as heat shrinkable plastic label. A thin layer of conductive material can be disposed between the inner wall of the housing and cathode 12. The layer may be disposed along the inner surface of the wall, along the circumference of cathode 12 or both. The layer can include a film-forming binder. The conductive material can be, for example, a carbonaceous material. Exemplary materials for forming conductive layers include LB1000 (Timcal, Ltd.), Eccocoat 257 (W. R. Grace & Co.), Electrodag 109 (Acheson Colloids, Co.), Electrodag 112 (Acheson) and EB0005 (Acheson). In some embodiments, oxidation of the carbonaceous material in the conductive layer by a $Bi^{5+}$-containing metal oxide cathode material can increase contact resistance between the cathode and the housing thereby degrading high-rate discharge performance, especially after storage. The conductive layer can include an oxidation-resistant graphite, e.g., Timrex® SFG15 (Timcal, Ltd.), and an oxidation-resistant film-forming binder. Methods of applying the conductive layer are disclosed in, for example, Canadian Patent 1,263,697, which is hereby incorporated by reference.

Current collector 20 is made from a suitable metal, such as brass. Seal 22 can be made, for example, of nylon.

Battery 10 can be assembled using conventional methods. In some embodiments, positive electrode 12 can be formed by a pack and drill method, described in U.S. Ser. No. 09/645,632, filed Aug. 24, 2000.

Battery 10 can be, for example, AA, AAA, AAAA, C, or D battery. In other embodiments, battery 10 can be non-cylindrical, such as coin cells, button cells, prismatic cells, flat cells, bag cells or racetrack shaped cells.

In other embodiments, a portion or all of the pentavalent bismuth in the bismuth-containing metal oxides can be substituted by one or more other pentavalent metals. Other suitable pentavalent metals include $Sb^{+5}$, $Nb^{+5}$, $Ta^{+5}$, and/or $V^{+5}$. Pentavalent metal oxides and pentavalent bismuth-containing metal oxides can form solid solutions having rutile, trirutile, fluorite, pyrochlore, or perovskite-type structures or other related structures. The substituted metal oxides or solid solutions of metal oxides can be either p-type or n-type semiconductors. Examples of such materials can include $ZnBi_{2-x}Nb_xO_6$ and $ZnBi_{2-x}Sb_xO_6$, and $MgBi_{2-x}Ta_xO_6$, where x=0<x<2. Trivalent bismuth may also be present in such materials as a minor constituent.

The following examples are illustrative and not intended to be limiting.

EXAMPLE 1

Five (5.00) grams of sodium bismuthate hydrate ($NaBiO_3.1.15H_2O$, Fluka, Germany, ≧85% purity) and 50 ml of an 0.398M zinc nitrate ($Zn(NO_3)_2$) aqueous solution were mixed with an additional 20 ml deionized water and sealed in a PTFE-lined 125 ml pressure vessel. The pressure vessel was heated to and held at 95° C. for 4.5 days. The pressure vessel was cooled to room temperature before opening.

A solid was separated from the liquid by vacuum filtration. The solid was washed by dispersing in 400 ml de-ionized water, stirring, and collecting the solid by centrifugation. The washing process was repeated three times. The washed solid was dried at 90° C. for 3 hours in vacuo to yield a reddish brown powder.

The powder was characterized using X-ray powder diffraction, chemical analysis, and thermal analysis. The X-ray powder diffraction pattern of the powder was consistent with that reported for trirutile $ZnBi_2O_6$. The lattice parameters were refined in the tetragonal space group $P4_2/mnm$. The calculated values (a=4.8437(4) Å and c=9.7420(1) Å) corresponded well with the reported values (a=4.8386(1) Å and c=9.7422(3) Å). The calculated crystallographic density, $d_x$=8.44 g/cm³ agreed well with the reported experimental specific gravity of 8.36 g/cm³. The Zn:Bi atom ratio of 1.05:2.00, determined by inductively-coupled plasma (ICP) spectroscopy (FIG. 3), was consistent with that for a trirutile structure. Thermal analysis of $ZnBi_2O_6$ by differential thermal analysis and thermogravimetric analysis (DTA/TGA) at a heating rate of 10° C./min to 550° C. in flowing air revealed a weight loss that started below about 300° C., which is believed to correspond to the decomposition of $ZnBi_2O_6$ to ZnO and $Bi_2O_3$ accompanied by oxygen loss. The experimentally observed weight loss of 5.6 weight percent corresponded closely to the calculated weight loss of 5.52 weight percent.

To increase the electrical conductivity of a cathode formed with the $ZnBi_2O_6$ powder, a thin coating of CoOOH was deposited onto the surface of the $ZnBi_2O_6$ particles. A solution containing 0.272 g cobalt sulfate hydrate ($CoSO_4.6.9H_2O$, Alfa-Aesar) dissolved in 20 ml of de-ionized water was added with stirring to a 500 ml flask containing a solution of 9.12 g ammonium peroxydisulfate, $(NH_4)_2S_2O_8$ (Alfa-Aesar, ≧98%) dissolved in 100 ml of de-ionized water and heated to 77° C. A slurry containing 9.765 g $ZnBi_2O_6$ powder mixed with a small amount of de-ionized water was added with vigorous stirring to the heated solution containing the $CoSO_4.6.9H_2O$ and $(NH_4)_2S_2O_8$. After stirring for 10 minutes at 77° C. 30 ml of 0.766M $NH_4OH$ solution was added to raise the pH. The stirred mixture was held at 77° C. for another hour and then allowed to cool to room temperature. A dark brown solid was separated by vacuum filtration, washed, and dried in vacuo at 60° C. for about 2 hours.

The fresh discharge performance of both un-coated (Example 1a) and CoOOH-coated $ZnBi_2O_6$ (Example 1b) was evaluated in 635-type alkaline button cells. Cathode mixtures were prepared by mixing about 6.00 g (60 weight percent) of the $ZnBi_2O_6$ active material with 3.50 g of natural graphite (Nacional de Grafite, type MP-0702x), and 0.50 g of an electrolyte solution containing 38 weight percent KOH and about 2 weight percent ZnO using a mortar and pestle. Cathode disks weighing nominally 0.45 g were pressed directly onto a fine nickel wire grid welded to the bottom of the cathode cans using an applied pressure of 5,000 lbs. A separator disk including a layer of cellophane laminated onto a non-woven layer was wetted with electrolyte and placed on top of the cathode disk. A plastic seal was positioned on the anode can and 2.50 g of gelled zinc slurry containing 60 weight percent zinc alloy particles, 39.5 weight percent electrolyte solution, and about 0.5 weight percent gelling agent was added to the can. The cell was closed and hermetically sealed by crimping. Multiple button cells were fabricated for each sample. Cells were typically stored for 24 hours at room temperature before discharging to ensure complete wetting of the cathode and separator by the electrolyte.

Figure 4:
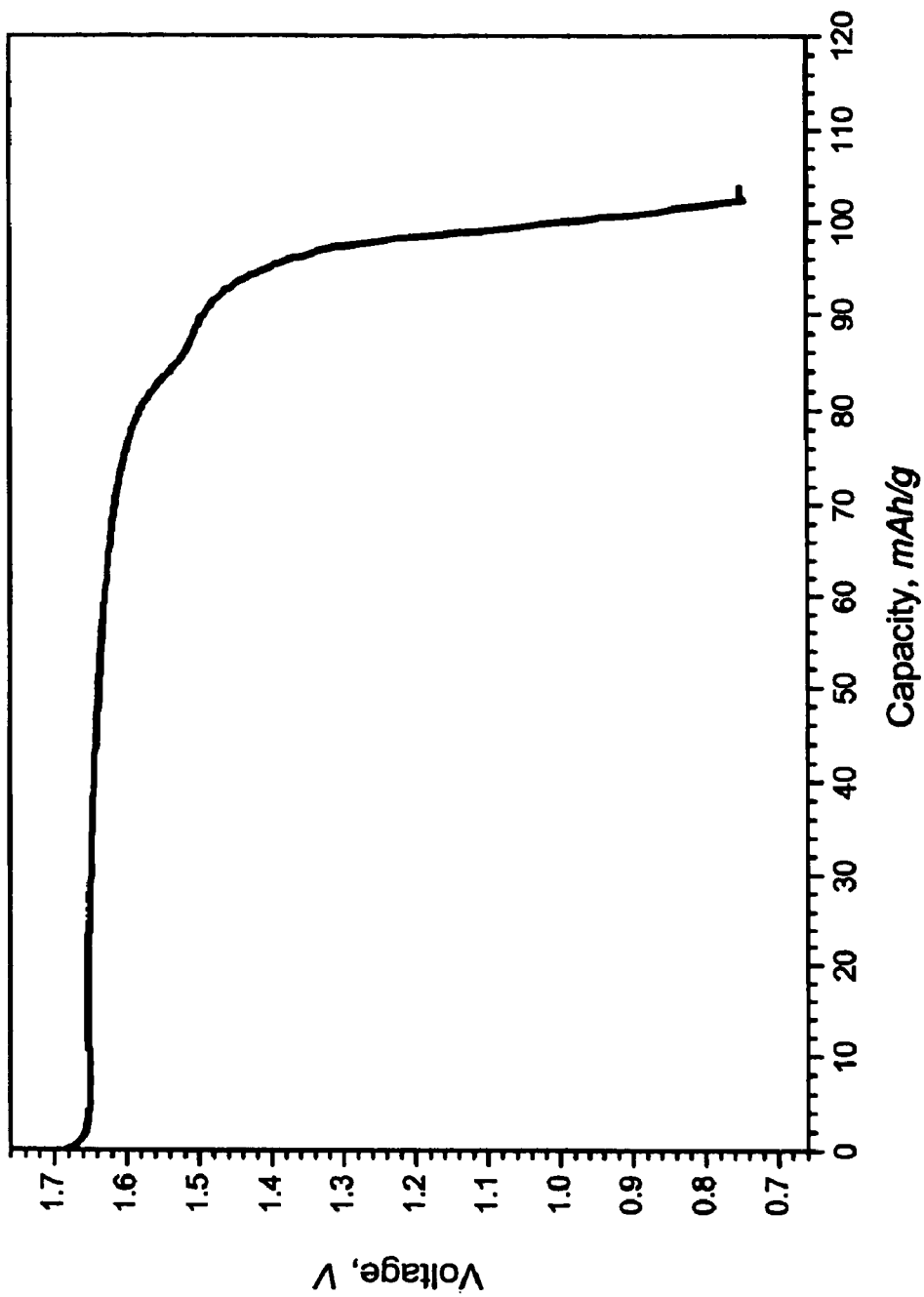
FIG. 4 is a discharge curve at a constant rate of nominally 15 mA/g for cobalt oxyhydroxide-coated $ZnBi_2O_6$ in an alkaline button cell discharged to a 0.8 V cutoff voltage.
Figure 5:
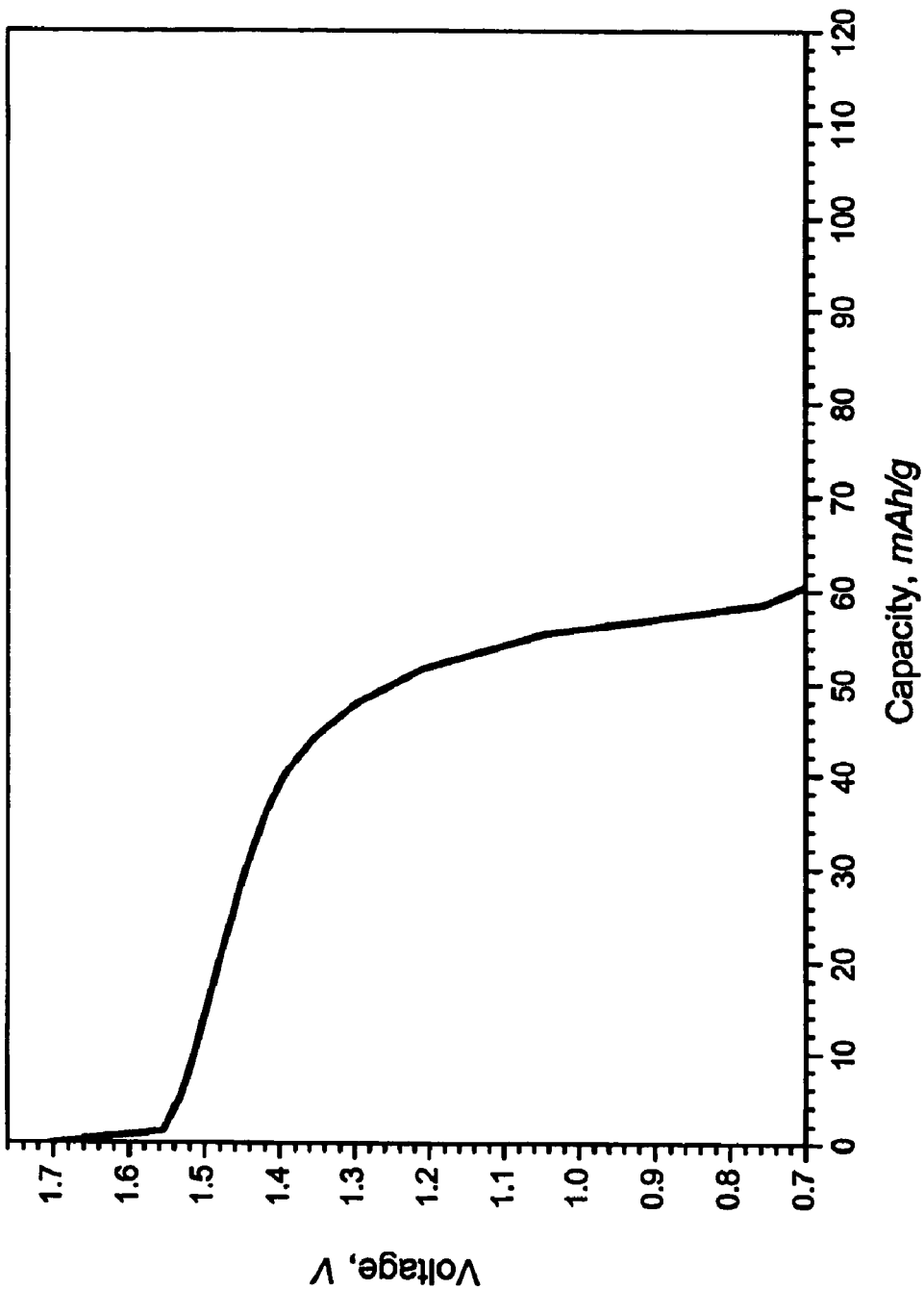
FIG. 5 is a discharge curve at a constant rate of nominally 150 mA/g for cobalt oxyhydroxide-coated $ZnBi_2O_6$ in an alkaline button cell discharged to a 0.8 V cutoff voltage.
Figure 6:
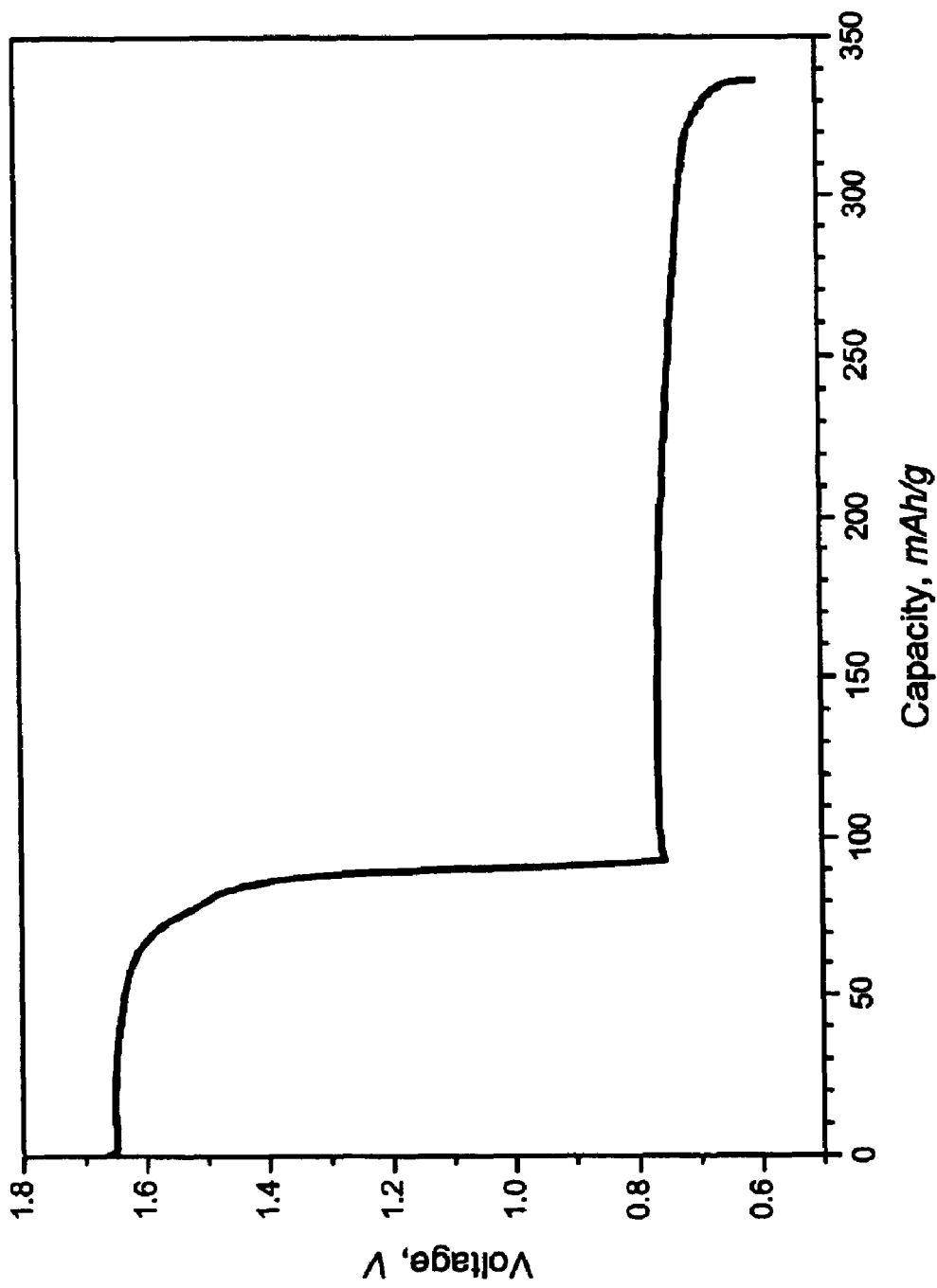
FIG. 6 is a discharge curve at a constant rate of nominally 15 mA/g for cobalt oxyhydroxide-coated $ZnBi_2O_6$ in an alkaline button cell discharged to a 0.6 V cutoff voltage.

The cell discharge data are shown in FIGS. 4-6. Cells having cathodes containing uncoated $ZnBi_2O_6$ had an average specific capacity of <10 mAh/g when discharged at low rates (e.g., 10 mA/g of $ZnBi_2O_6$) to a 0.8 V cutoff voltage. For cells having 3 weight percent CoOOH-coated $ZnBi_2O_6$, the low rate capacity increased to about 100 mAh/g to a 0.8 V cutoff voltage, which corresponds to about 55% of the theoretical four-electron (e.g., 2 electrons/Bi) specific capacity of 185 mAh/g calculated for $ZnBi_2O_6$ (FIG. 7). The average OCV after 24 hours rest was about 1.70 V. Some low-rate discharge curves for the button cells of Example 1b containing CoOOH-coated $ZnBi_2O_6$ discharged at a nominal 15 mA/g (i.e., C/30) rate to a 0.8 V cutoff voltage are shown in FIG. 4. The average low-rate running voltage was 1.65 V. Typical high-rate discharge curves for button cells discharged at a nominal 150 mA/g (i.e., 0.8 C) rate to a 0.8 V cutoff voltage are shown in FIG. 5. The average high-rate running voltage was about 1.45 V. X-ray powder diffraction analysis of the cathode after continuous discharge to 0.8 V cutoff voltage revealed the presence of graphite, $Bi_2O_3$, zinc oxide, and bismuth metal. Typical low-rate discharge curves for button cells discharged at a nominal 10 mA/g (i.e., C/30) rate to a 0.6 V cutoff voltage are shown in FIG. 6. A second discharge plateau having an average running voltage of about 0.76 V was present. The total specific capacity for the two plateaus was about 335 mAh/g, which represents about 70% of the theoretical ten-electron capacity (e.g., 5 electrons/Bi) calculated for $ZnBi_2O_6$. X-ray powder diffraction analysis of cathodes discharged to a 0.6 V cutoff voltage revealed graphite, bismuth metal, and zinc oxide to be present, but no $Bi_2O_3$. The low-rate specific capacities to a 0.8 V cutoff voltage (i.e., upper plateau only) and to a 0.6 V cutoff voltage (i.e., upper and lower plateaus combined) for cells of Examples 1a and 1b are given in FIG. 7.

EXAMPLE 2

Five (5.00) g of sodium bismuthate hydrate ($NaBiO_3.1.37H_2O$, Aldrich, ACS reagent) and 13.35 g magnesium chloride hexahydrate ($MgCl_2.6H_2O$, Alfa-Aesar, 99-102%) were mixed with about 60 ml of de-ionized water and sealed in a PTFE-lined 125 ml pressure vessel. The pressure vessel and contents were heated to and held at 135° C. for 2.5 days. The pressure vessel was cooled to room temperature before opening.

A solid was separated from the liquid by vacuum filtration and washed with several portions of de-ionized water. The solid was washed further by dispersing it in 1000 ml of de-ionized water, stirring for 30 minutes, and collecting the solid by vacuum filtration. The washing process was repeated. The washed solid was dried in air at room temperature, at about 95-105° C. for 4 hours in vacuo, and finally at 115° C. for about 14 hours to yield a dark brown powder.

The powder was characterized using X-ray powder diffraction, chemical analysis, and thermal analysis. The X-ray powder diffraction pattern was consistent with that reported for trirutile $MgBi_2O_6$. The lattice parameters were refined in the tetragonal space group $P4_2/mnm$. The values obtained (a=4.82168(3) Å and c=9.71194(8) Å) corresponded closely to the reported values (a=4.8187(1) Å and c=9.7067(2) Å). The calculated crystallographic density, $d_x$=7.92 g/cm$^3$ agreed well with the reported experimental specific gravity of 7.96 g/cm$^3$. The Mg:Bi atom ratio of 1.02:2.00, determined by ICP spectroscopy (FIG. 3), was consistent with that of a trirutile structure. Thermal analysis of $MgBi_2O_6$ by DTA/TGA (10° C./min to 550° C.) revealed a weight loss starting below about 400° C. in flowing air corresponding to a decomposition to MgO and $Bi_2O_3$ accompanied by oxygen loss. The experimentally observed weight loss of 5.91 weight percent closely corresponded to the calculated weight loss of 5.94 weight percent.

To increase the electrical conductivity of a cathode formed of the $MgBi_2O_6$ powder, a thin coating of CoOOH was deposited onto the surface of the $MgBi_2O_6$ particles. A slurry containing 9.43 g $MgBi_2O_6$ powder mixed with a small amount of de-ionized water was added with stirring to 50 ml of aqueous 0.8 M ammonium peroxydisulfate, $(NH_4)_2S_2O_8$ (Alfa-Aesar, ≧98%) solution and heated at 74-76° C. in a 500 ml flask. Twenty (20) ml of aqueous 0.175 M cobalt sulfate hydrate ($CoSO_4$.6$H_2O$, Alfa-Aesar) solution was added with stirring to the mixture of $MgBi_2O_6$ and ammonium peroxydisulfate. After stirring for about 15 minutes at 75° C., 40 ml of 5.0 M KOH solution was added to increase pH ≧14, and stirring was continued for an additional 45 minutes. The mixture was allowed to cool to room temperature. A dark brown solid was separated from the clear liquid by vacuum filtration, washed thoroughly, and dried in vacuo at 90-115° C. for about 2 hours.

The fresh discharge performance of both un-coated (Example 2a) and CoOOH-coated $MgBi_2O_6$ (Example 2b) was evaluated in 635-type alkaline button cells. Cathode mixtures were prepared by mixing about 7.50 g of the $MgBi_2O_6$ (75 weight percent) active material with 2.00 g of natural graphite (Nacional de Grafite, type MP-0702x), and 0.50 g of an electrolyte solution containing 38 weight percent KOH and about 2 weight percent ZnO using a mortar and pestle. Multiple button cells were fabricated as described in Example 1 for each sample. Cells typically were stored for 24 hours at room temperature before discharge.

Figure 8:
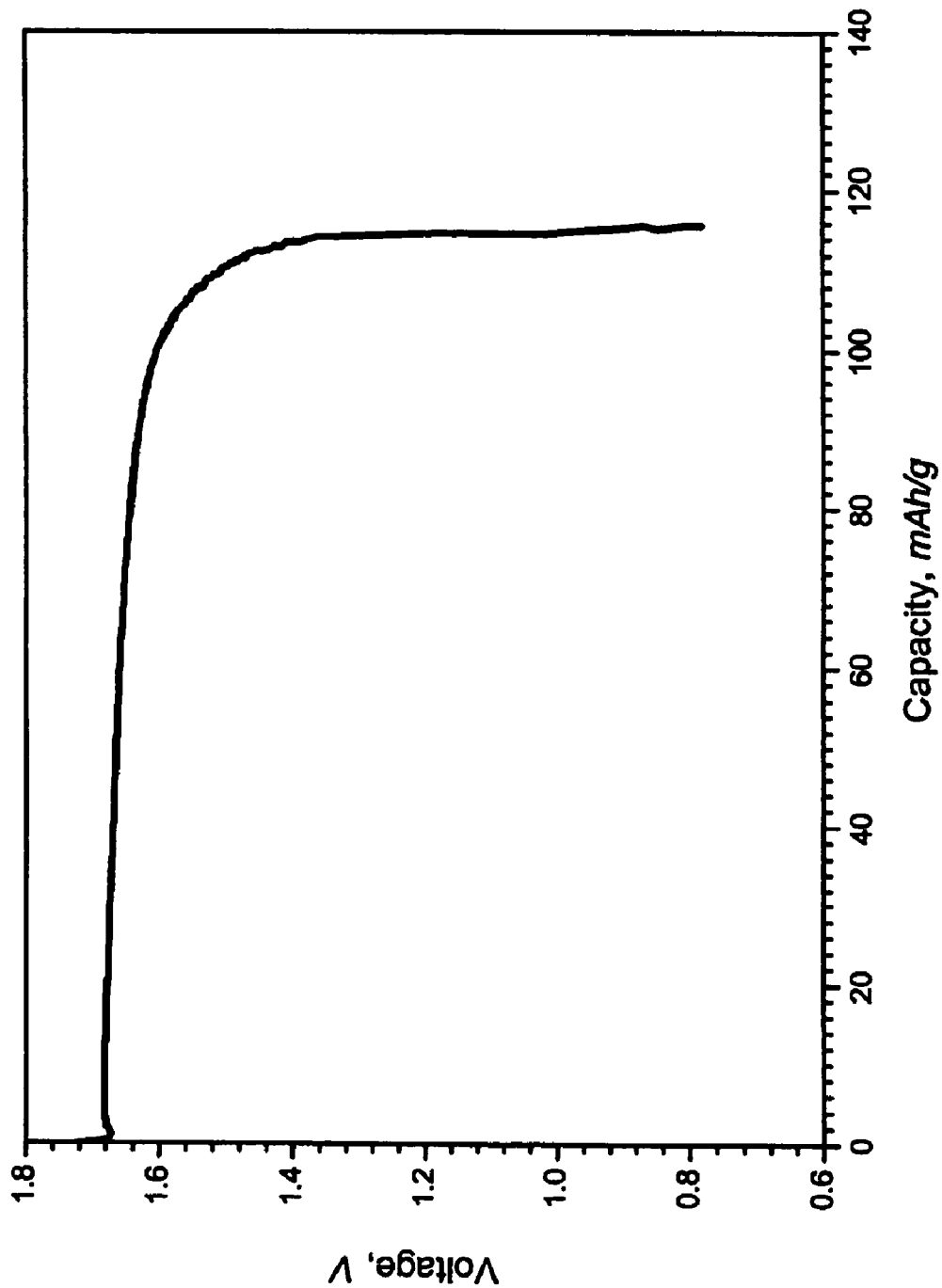
FIG. 8 is a discharge curve at a constant rate of nominally 10 mA/g for cobalt oxyhydroxide coated $MgBi_2O_6$ in an alkaline button cell discharged to a 0.8 V cutoff voltage.
Figure 9:
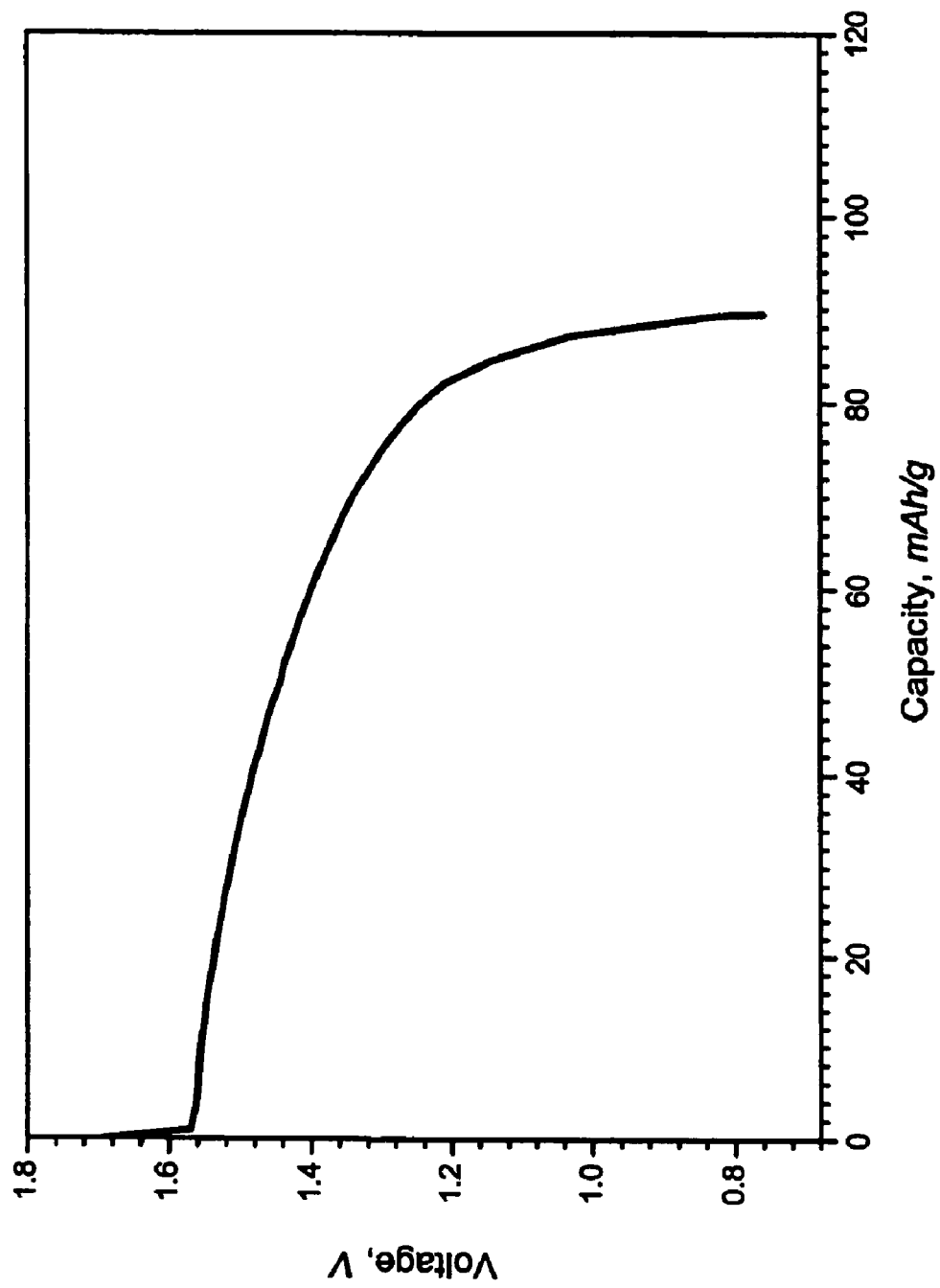
FIG. 9 is a discharge curve at a constant rate of nominally 150 mA/g for cobalt oxyhydroxide coated $MgBi_2O_6$ in an alkaline button cell discharged to a 0.8 V cutoff voltage.
Figure 10:
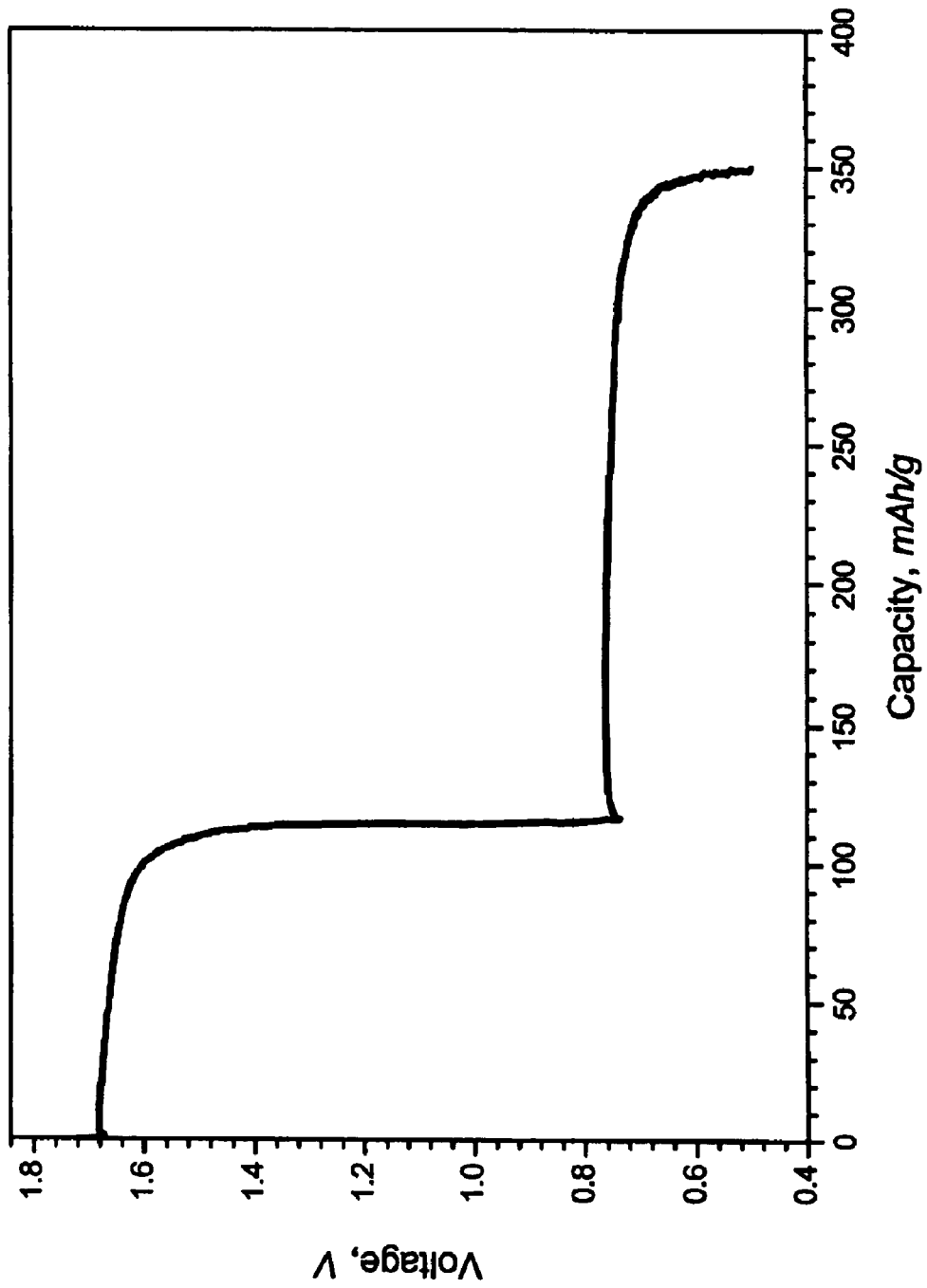
FIG. 10 is a discharge curve at a constant rate of nominally 10 mA/g for cobalt oxyhydroxide coated $MgBi_2O_6$ in an alkaline button cell discharged to a 0.6 V cutoff voltage.

The cell discharge data are shown in FIGS. 8-10. The average OCV after 24 hours storage at room temperature was about 1.70 V. Typical low-rate discharge curves for button cells of Example 2b containing CoOOH-coated $MgBi_2O_6$ discharged at a nominal 10 mA/g (i.e., C/30) rate to a 0.8 V cutoff voltage are shown in FIG. 8. The low-rate specific capacity was about 115 mAh/g, which corresponds to about 60% of the theoretical four-electron capacity (2 electrons/Bi) of 199 mAh/g calculated for $MgBi_2O_6$. The average low-rate running voltage was about 1.68 V. Typical high-rate discharge curves for button cells of Example 2b discharged at a nominal 150 mA/g (i.e., 0.8 C) rate to a 0.8 V cutoff voltage are shown in FIG. 9. The average high-rate running voltage was about 1.48 V. Typical low-rate discharge curves for button cells of Example 2b discharged at a nominal 10 mA/g (i.e., C/30) rate to a 0.6 V cutoff voltage are shown in FIG. 10. The total specific capacity was extended to about 345 mAh/g, which corresponds to about 70% of the theoretical 10-electron specific capacity of 498 mAh/g. A second discharge plateau having an average running voltage of about 0.76 V was present. The low-rate and high-rate specific capacities to a 0.8 V cutoff voltage (i.e., upper voltage plateau only) and to a 0.6 V cutoff voltage (i.e., upper and lower voltage plateaus combined) for cells of Examples 2a and 2b are given in FIG. 7.

EXAMPLE 3

Five (5.00) g of sodium bismuthate hydrate ($NaBiO_3$.1.15$H_2O$, Fluka, Germany; ≧85% purity) and 4.83 g copper nitrate ($Cu(NO_3)_2$.3$H_2O$) were mixed with 60 ml deionized water and sealed in a PTFE-lined 125 ml pressure vessel. The pressure vessel was heated to and held at 125° C. for 4.5 days. The pressure vessel was cooled to room temperature before opening.

A solid was separated from a blue-colored clear liquid by decantation. The solid was washed completely by dispersing in 500 ml of de-ionized water, stirring, and collecting the solid by vacuum filtration. The washing process was repeated three times. The washed solid was dried at about 95° C. for 5 hours in vacuo to yield a reddish brown powder.

The solid was characterized using X-ray powder diffraction, chemical analysis, and thermal analysis. The X-ray powder diffraction pattern for the solid was not consistent with a trirutile-type structure. It is hypothesized that the structure was more closely related to a defect pyrochlore structure or a defect fluorite structure. Further, the Cu:Bi atom ratio as determined by ICP spectroscopy was about 1.50:2.00, rather than 1.00:2.00 as for a trirutile structure. The residual sodium content was determined to be negligible (FIG. 3). Thermal analysis of the solid using DTA/TGA (10° C./min to 550° C.) revealed a weight loss starting at about 300° C. in flowing air, possibly corresponding to a decomposition to CuO and $Bi_2O_3$ accompanied by oxygen loss. However, the total weight loss of 11.64 weight percent substantially exceeded the calculated weight loss of 4.87 weight percent corresponding to formation of CuO, $Bi_2O_3$, and oxygen. This data suggested that the solid could have been hydrated with water included in the crystal lattice as well as possibly some nitrate.

Figure 11:
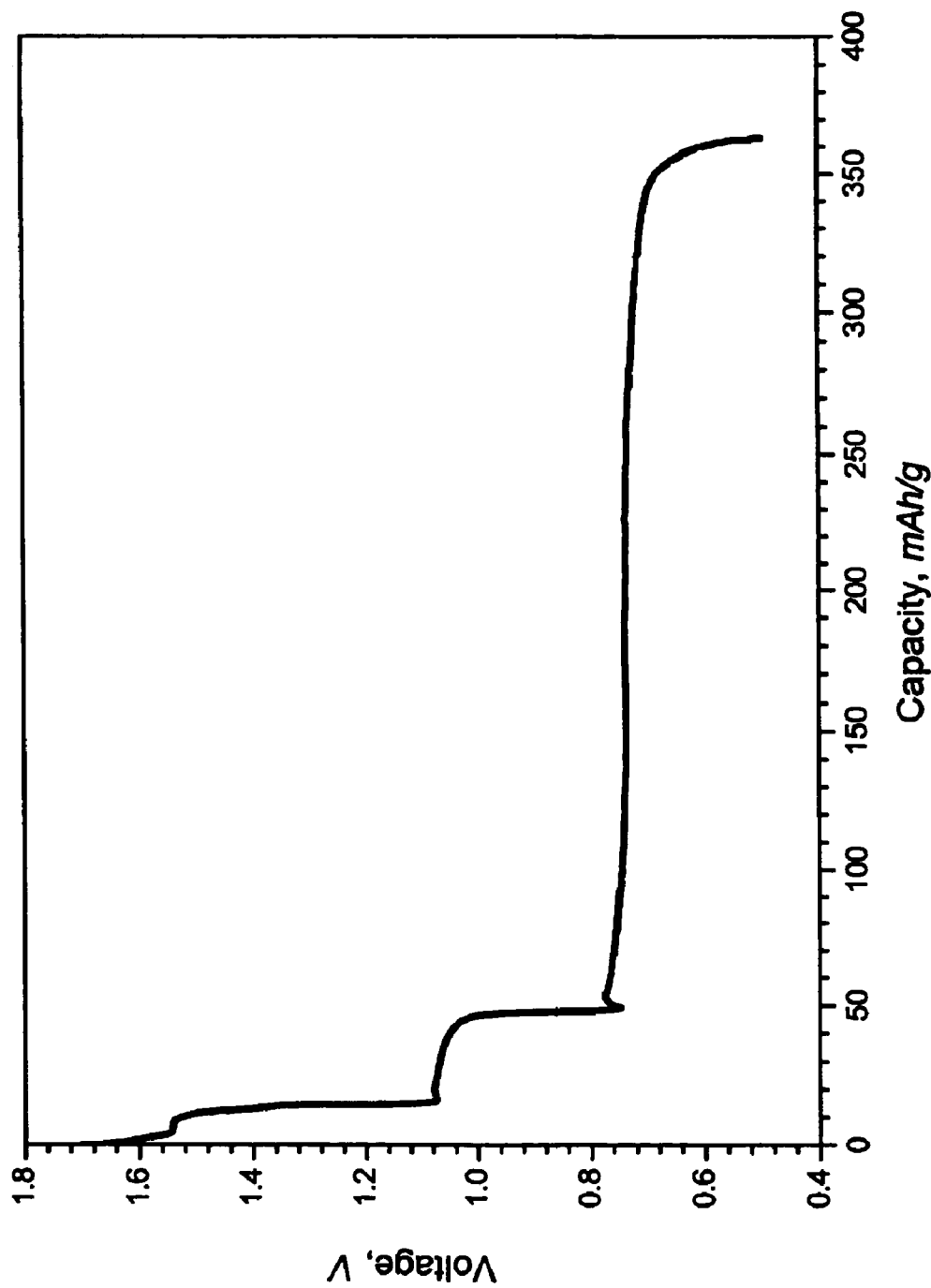
FIG. 11 is a discharge curve at a constant rate of nominally 10 mA/g for $CuBi_2O_7$ in an alkaline button cell discharged to a 0.6 V cutoff voltage.

The fresh discharge performance of the hydrated solid was evaluated in 635-type alkaline button cells. Cathode mixtures were prepared and cells fabricated as described in Example 1. Cells typically were stored for about 24 hours at room temperature before discharge. Typical low-rate discharge curves for button cells containing the solid discharged at a nominal 10 mA/g (i.e., C/30) rate to a 0.6 V cutoff voltage are shown FIG. 11. The total specific capacity was about 360 mAh/g, which corresponds to about 63 percent of the theoretical 14-electron specific capacity of 571 mAh/g. The average OCV after 24 hours storage at room temperature was about 1.70 V. Three distinct voltage plateaus were evident in the low-rate discharge curve. The nominal average running voltages for the upper, middle, and lower plateaus were about 1.5-1.6 V, 1.06 V, and 0.74 V, respectively. It is hypothesized that the upper discharge plateau corresponds to the reduction of $Bi^{5+}$ to $Bi^{3+}$, the middle plateau to the reduction of $Cu^{2+}$ to $Cu^+$, and the lowest plateau to the combined reduction of $Bi^{3+}$ to $Bi^0$ and $Cu^+$ to $Cu^0$. At high discharge rates (e.g., 150 mA/g), the highest discharge plateau was absent and the two lower plateaus were observed at about 0.9 V and 0.65 V. The total specific capacities for cells discharged at low and high-rates are given in FIG. 7.

EXAMPLE 4

Five (5.00) g of sodium bismuthate hydrate ($NaBiO_3.1.37H_2O$, Aldrich, ACS Reagent grade) and 100 ml of 0.5 M silver nitrate ($AgNO_3$, Alfa-Aesar, ACS Reagent grade) solution were mixed and sealed in a PTFE-lined 125 ml pressure vessel. The pressure vessel was heated to and held at about 80° C. for 22 hours. The pressure vessel was cooled to room temperature before opening.

A solid was separated from the liquid by vacuum filtration and washed with several portions of de-ionized water. The solid was washed further by dispersing it in 1500 ml of de-ionized water, stirring for 30 minutes, and collecting the solid by vacuum filtration. The washing process was repeated twice. The washed solid was dried in air at room temperature, at about 95-105° C. for 4 hours in vacuo, and finally at about 80° C. for 16 hours to yield a black powder. The solid was stored in an amber bottle to protect it from light.

The solid was characterized using X-ray powder diffraction, chemical analysis, and thermal analysis. The X-ray powder diffraction pattern was consistent with that reported for silver bismuthate, $AgBiO_3$, having an ilmenite-type structure. The lattice parameters were refined in the rhombohedral space group $R\bar{3}$. The lattice parameters (a=5.6353(6) Å and c=16.094(2) Å) corresponded well to the reported values (a=5.641(1) Å and c=16.118(2) Å). The calculated crystallographic density, $d_x$=8.21 $g/cm^3$ agreed well with the reported crystallographic density, $d_x$=8.18 $g/cm^3$. The Ag:Bi atom ratio of 1.02:1.00, determined by ICP spectroscopy (FIG. 3), was consistent with that of an ilmenite-type structure. Thermal analysis of $AgBiO_3$ using DTA/TGA at a heating rate of 10° C./min to 550° C. in flowing air revealed a weight loss starting below about 200° C. corresponding to decomposition of $AgBiO_3$ to Ag and $Bi_2O_3$ accompanied by oxygen evolution. The experimentally observed total weight loss of 6.68 weight percent was consistent with the calculated weight loss of 6.58 weight percent.

Figure 12:
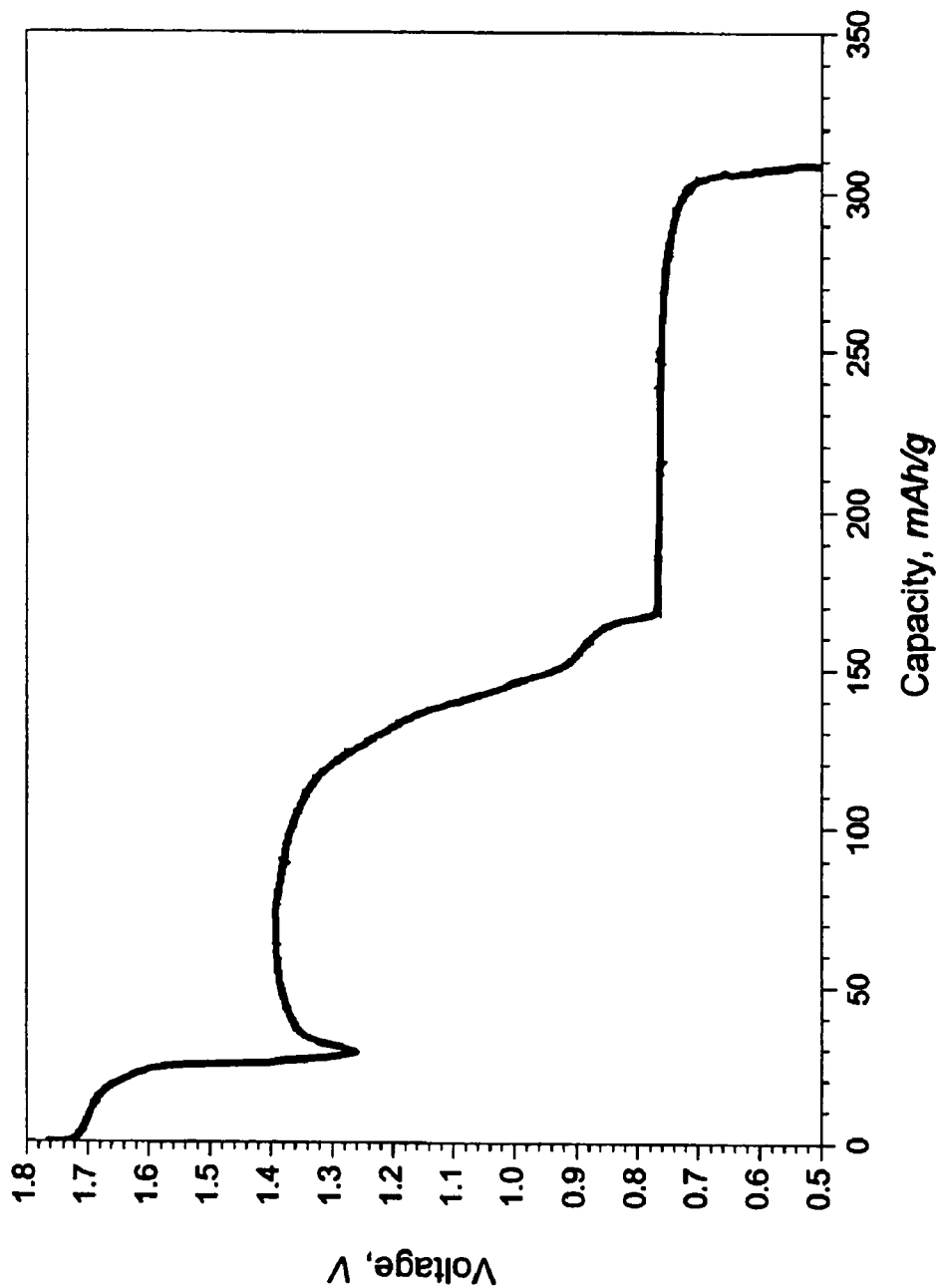
FIG. 12 is a discharge curve at a constant rate of nominally 10 mA/g for $AgBiO_3$ in an alkaline button cell discharged to a 0.6 V cutoff voltage.

The fresh discharge performance of silver bismuthate was evaluated in 635-type alkaline button cells. Cathode mixtures were prepared and cells fabricated as described in Example 1. Cells were stored for 2 hours at room temperature before discharge. Typical low-rate discharge curves for button cells containing silver bismuthate discharged at a nominal 10 mA/g (C/30) rate to a 0.6 V cutoff voltage are shown in FIG. 12. The total specific capacity was about 310 mAh/g, which corresponds to about 70 percent of the theoretical six-electron capacity of about 444 mAh/g. The average OCV after 24 hours storage at room temperature was about 1.74 V. Three distinct voltage plateaus were evident in the low-rate discharge curve. The nominal running voltages for the upper, middle, and lower plateaus were about 1.74 V, 1.36 V, and 0.77 V, respectively. However, cells stored at room temperature for 24 hours before discharging had only the two lower discharge plateaus at about 1.38 V and 0.77 V. Total specific capacities for cells discharged at the low- and high-rates are given in FIG. 7.

EXAMPLE 5

A PTFE reaction vessel containing 70 g of solid potassium hydroxide pellets (KOH, 85%, Aldrich, ACS Reagent) was placed in a furnace and heated in air to about 250° C. After the KOH had melted, 8.45 g of sodium bismuthate hydrate ($NaBiO_3.1.37H_2O$, Alfa Aesar, ACS Reagent) was added slowly to the melt with stirring. The mixture was held at 250° C. for 14 hours. The reaction vessel was removed from the furnace and before it cooled to room temperature, a clear, yellow supernatant liquid was decanted off the dark brown solid that had deposited on the bottom of the reaction vessel. The reaction vessel was allowed to cool to room temperature, about 1000 ml of de-ionized water added, and the mixture stirred for about 30 minutes.

A solid was separated from the liquid by vacuum filtration and washed with several additional portions of de-ionized water. The solid was washed further by re-dispersing it in 1000 ml of de-ionized water, stirring for 30 minutes, and collecting the solid by vacuum filtration. The washing process was repeated 4-5 times. The washed solid was dried in vacuo at 80° C. for about 5 hours to yield a dark reddish brown powder.

The solid reaction product was characterized using X-ray powder diffraction and thermal analysis. The X-ray powder diffraction pattern of the reaction product was consistent with that reported for KBiO3, having a cubic $KSbO_3$-type crystal structure. The lattice parameter was refined in the cubic space group $Im\bar{3}$. The lattice parameter (a=10.0199(9) Å) corresponded to the values reported for anhydrous $KBiO_3$ (a=10.0194(6) Å) and hydrated $KBiO_3.45H_2O$ (a=10.0175 (2) Å). Thermal analysis of the reaction product by differential thermal analysis and thermogravimetric analysis (DTA/TGA) at a heating rate of 10° C./min to 550° C. in flowing air revealed a gradual weight loss that started at about 250° C., that is believed to correspond to the decomposition of $KBiO_3$ to $Bi_2O_3$ and $K_2O$ accompanied by oxygen loss. The experimentally observed weight loss of 5.08 weight percent is nearly consistent with the weight loss of 5.40 weight percent calculated for anhydrous $KBiO_3$.

Figure 15:
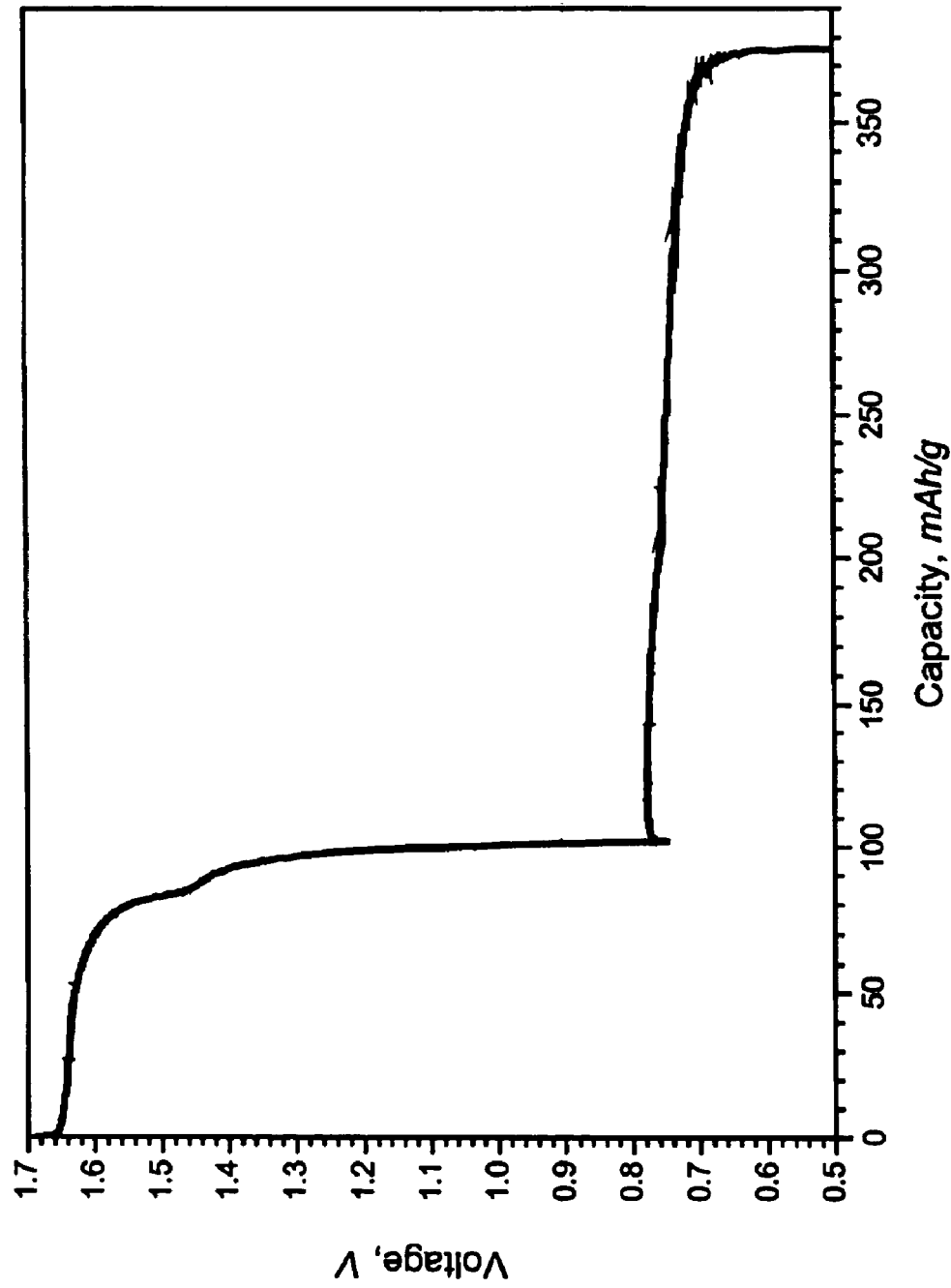
FIG. 15 is a discharge curve at a constant rate of nominally 10 mA/g for cobalt oxyhydroxide-coated $KBiO_3$ in an alkaline button cell discharged to a 0.6 V cutoff voltage.

To increase the electrical conductivity of a cathode formed of the $KBiO_3$ powder, a thin coating of CoOOH was deposited onto the surface of the $KBiO_3$ particles by a process similar to that described in Example 2. The fresh discharge performances of uncoated (Example 5a) and CoOOH-coated (Example 5b) potassium bismuthate were evaluated in 635-type alkaline button cells. Cathode mixtures were prepared and cells fabricated as described in Example 1. Cells were stored for 24 hours at room temperature before discharge. A typical low-rate discharge curve for button cells containing CoOOH-coated potassium bismuthate discharged at a nominal 10 mA/g (C/30) rate to a 0.6 V cutoff voltage is shown in FIG. 15. The average OCV after 24 hours storage at room temperature was about 1.67 V. The profile of the low-rate discharge voltage curve was very similar to that for silver bismuthate cells that had been discharged after 2 hours storage at room temperature. The total specific capacity for the potassium bismuthate cells was about 375 mAh/g, which corresponds to about 83 percent of the theoretical five-electron capacity of about 453 mAh/g. Two voltage plateaus were evident in the low-rate discharge curve. The nominal average running voltages for the upper and lower plateaus were about 1.5 V and 0.76 V, respectively. The specific capacity on the upper plateau was about 105 mAh/g, which corresponds to about 58% of the theoretical two-electron capacity of about 181 mAh/g. Total specific capacities for cells discharged at the low- and high-rates are given in FIG. 7.

EXAMPLE 6

About four grams (4.07 g) of sodium bismuthate hydrate ($NaBiO_3.2H_2O$; Kanto Chemical Co., Japan; ≧80% purity)

was added to a solution of 14.22 g strontium chloride hexahydrate ($SrCl_2 \cdot 6H_2O$; Alfa Aesar; Technical) in 60 ml deionized water, and the resulting mixture was sealed in a PTFE-lined 125 ml pressure vessel. The pressure vessel was heated to and held at 90° C. for 2.5 days. The pressure vessel was cooled to room temperature before opening.

A solid was separated from the reaction mixture by vacuum filtration. The solid was washed with several portions of deionized water, collected by vacuum filtration, and dried at about 60° C. for 24 hours in air to yield a light brown powder.

The solid product was characterized using X-ray powder diffraction, chemical analysis, and thermal analysis. The X-ray powder diffraction pattern for the solid was consistent with that reported for strontium bismuthate, $SrBi_2O_6$, having an ilmenite-type structure. No residual sodium was detected by SEM/EDS analysis of the powder. Thermal analysis of the solid using DTA/TGA (10° C./min to 600° C.) in flowing air revealed a weight loss starting below about 150° C. corresponding to loss of water and another weight loss starting at about 250° C. corresponding to decomposition via an intermediate phase to $SrBi_2O_4$ accompanied by oxygen loss. The experimentally observed weight loss was 5.76 weight percent, compared to the calculated weight loss of 5.32 weight percent. The X-ray powder diffraction pattern of the final decomposition product was consistent with that reported for strontium bismuthate, $SrBi_2O_4$.

To increase the electrical conductivity of a cathode formed of the $SrBi_2O_6$ powder, a thin coating of CoOOH was deposited onto the surface of the $SrBi_2O_6$ particles as described in Example 2. The fresh discharge performance of CoOOH-coated $SrBi_2O_6$ was evaluated in 635-type button cells. Cells were fabricated as described in Example 1, except two separator disks were used in place of the single separator disk. The first separator disk included a layer of cellophane laminated onto a non-woven layer identical to Example 1. The second separator disk included a cellophane layer laminated between two layers of a grafted, high-density polyethylene microporous membrane and was positioned adjacent to the cathode and underlying the first separator disk. The cellophane layer of the first separator disk was oriented toward the second separator disk. Cells were stored for 24 hours at room temperature before discharge.

The average OCV after 24 hours storage at room temperature was about 1.71 V. A typical low-rate discharge curve for button cells containing CoOOH-coated strontium bismuthate discharged at a nominal 10 mA/g (C/18) rate to a 0.8 V cutoff voltage is shown in FIG. 16. Two voltage plateaus were evident in the low-rate discharge curve. The nominal average running voltages for the upper and lower plateaus were about 1.56 V and 0.76 V, respectively. The profile of the low-rate discharge voltage curve was similar to those for the CoOOH-coated zinc, magnesium, and potassium bismuthate cells. The low-rate specific capacity on the upper voltage plateau of the strontium bismuthate cells was about 89 mAh/g, which corresponds to about 50 percent of the theoretical four-electron capacity of about 178 mAh/g. The high-rate specific capacity on the upper voltage plateau of the strontium bismuthate cells discharged at a nominal 140 mA/g (0.8 C) to a 0.8 V cutoff voltage was about 67 mAh/g. Total specific capacities for cells discharged at low- and high-rates are given in FIG. 7.

COMPARATIVE EXAMPLE 1

Figure 13:
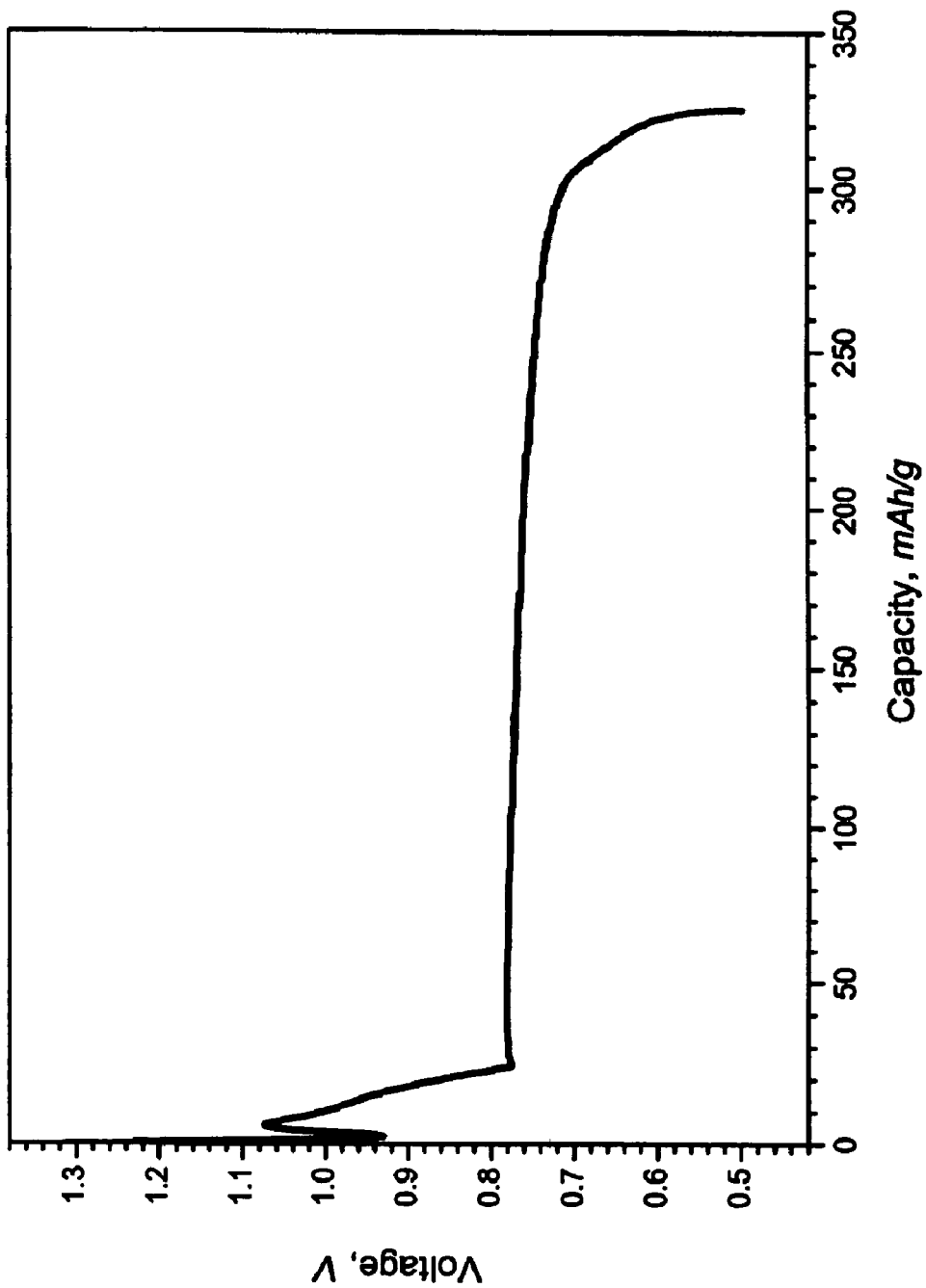
FIG. 13 is a discharge curve at a constant rate of nominally 10 mA/g for $NaBiO_3$ $1.37H_2O$ in an alkaline button cell discharged to a 0.6 V cutoff voltage.

The fresh discharge performance of sodium meta-bismuthate ($NaBiO_3 \cdot 1.37H_2O$, Aldrich, ACS Reagent) was evaluated in 635-type alkaline button cells. Cathode mixtures were prepared and cells fabricated as described in Example 1. Because of the high solubility of $NaBiO_3 \cdot 1.37H_2O$, cells were discharged within two hours after fabrication at a low-rate of about 10 mA/g (i.e., C/30) to a 0.6 V cutoff voltage. Two voltage plateaus were present in the discharge curve at about 1.55 V and 0.78 V. The theoretical five-electron specific capacity for $NaBiO_3 \cdot 1.37H_2O$ is about 440 mAh/g. The average specific capacity for cells discharged immediately after fabrication at low-rate to a 0.6 V cutoff voltage was about 405 mAh/g, corresponding to about 92 percent of the theoretical value. The average OCV for the cells immediately after fabrication was about 1.67 V. Cells stored at room temperature for about 24 hours before discharge had only one voltage plateau at about 0.78 V as shown in FIG. 13. The average OCV for cells stored at room temperature for about 24 hours before discharge still was about 1.67 V. However, the cells had average specific capacities at low-rate to a 0.6 V cutoff voltage of about 325 mAh/g, corresponding to about 74 percent of the theoretical value. Most of the observed capacity loss resulted from the disappearance of the 1.55 V plateau possibly due, it is believed, to self-discharge of $Bi^{5+}$ via oxidation of water in the electrolyte to oxygen.

COMPARATIVE EXAMPLE 2

Four (4.00) g of sodium bismuthate hydrate ($NaBiO_3 \cdot 1.37H_2O$, Aldrich, ACS reagent) and 1.328 g potassium nitrate ($KNO_3$, Alfa Aesar, 99.0%) were mixed with about 65 ml of de-ionized water and sealed in a PTFE-lined 125 ml pressure vessel. The pressure vessel was heated at 80° C. for several hours. The temperature was increased and held at 135-145° C. for about 4.5 days. The pressure vessel was cooled to room temperature before opening.

A solid was separated from the liquid by vacuum filtration and washed with several portions of de-ionized water. The solid was washed further by dispersing it in 1000 ml of de-ionized water, stirring for 30 minutes, and collecting the solid by vacuum filtration. The washing process was repeated 4-5 times. The washed solid was dried in air at room temperature for about 12 hours, then in vacuo at 115° C. for about 20 hours to yield an orange-brown powder.

The solid was characterized using X-ray powder diffraction, chemical analysis, and thermal analysis. The X-ray powder diffraction pattern of the reaction product was consistent with that for monoclinic bismuth tetroxide, $Bi_2O_4$, having a $\beta$-$Sb_2O_4$-type crystal structure. The X-ray powder diffraction pattern revealed the presence of a trace amount of unreacted $NaBiO_3 \cdot 1.37H_2O$ as well as the presence of several unassigned peaks having very low intensities. The lattice parameters were refined in the monoclinic space group C2/c to give: a=12.373(1) Å, b=5.1195(4) Å, c=5.5707(4) Å, and $\beta$=107.829(5)°. These values were consistent with the values reported for monoclinic $Bi_2O_4$ of: a=12.3668(2) Å, b=5.1180(1) Å, c=5.5670(1) Å, and $\beta$=107.838(1)°.

Figure 14:
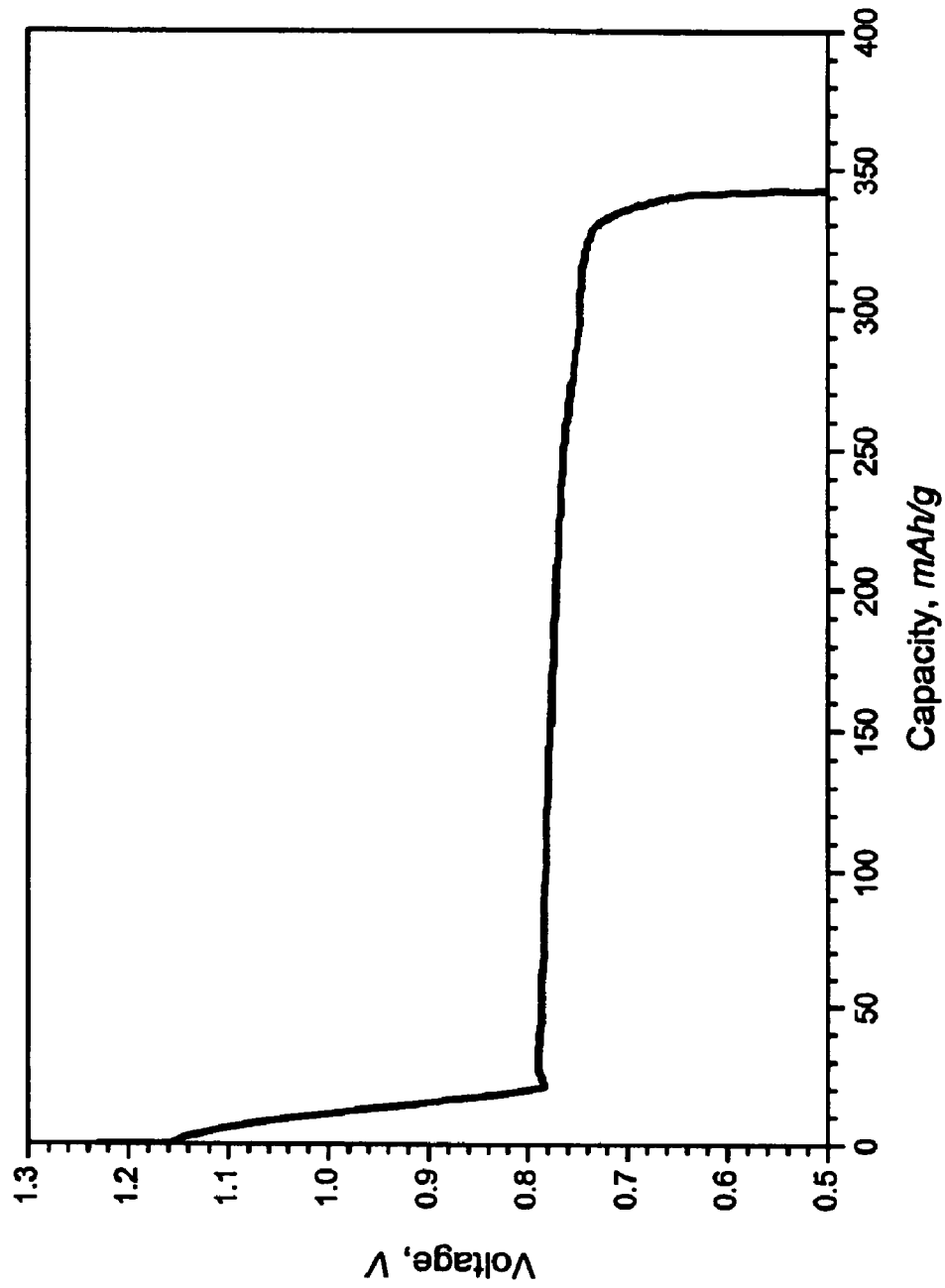
FIG. 14 is a discharge curve at a constant rate of nominally 10 mA/g for $Bi_2O_4$ in an alkaline button cell discharged to a 0.6 V cutoff voltage.

The fresh discharge performance of monoclinic $Bi_2O_4$ was evaluated in 635-type alkaline button cells. Cathode mixtures were prepared and cells fabricated as described in Example 2. Cells were stored for about 24 hours at room temperature before discharge. The average OCV after 24 hours storage at room temperature was about 1.2 V. Typical low-rate discharge curves for button cells containing monoclinic $Bi_2O_4$ discharged at a nominal 10 mA/g (i.e., C/30) rate to a 0.6 V cutoff voltage are shown in FIG. 14. Only one voltage plateau was present in the low-rate discharge curve at about 0.78 V. The eight-electron theoretical specific capacity for monoclinic $Bi_2O_4$ is about 445 mAh/g. The average specific capacity for cells discharged at low-rate to a 0.6 V cutoff voltage was about 336 mAh/g, corresponding to about 75 percent of the theoretical value.

COMPARATIVE EXAMPLE 3

Fresh discharge performance of bismuth (+3) sesquioxide, $Bi_2O_3$ (Fisher Chemical, certified) was evaluated in 635-type alkaline button cells. Cathode mixtures were prepared and cells were fabricated as described in Example 2. Cells were stored at room temperature for about 24 hours before discharge. The average OCV after 24 hours storage was about 1.10 V. Cells were discharged at a nominal low rate of 10 mA/g (i.e., C/30) to a 0.6 V cutoff voltage. A single discharge plateau was present with an average running voltage of about 0.78 V. The theoretical six-electron specific capacity for $Bi_2O_3$ is about 345 mAh/g. The average specific capacity for cells discharged at low-rate to a 0.6 V cutoff voltage was about 260 mAh/g, corresponding to about 75 percent of the theoretical value.

The alkaline cells of Examples 1b, 2b, and 5b with cathodes containing cobalt oxyhydroxide-coated $ZnBi_2O_6$, $MgBi_2O_6$, and $KBiO_3$ exhibited a substantial capacity (e.g., >100 mAh/g) on the upper voltage plateau (e.g., 1.55 to 1.65 V) when discharged continuously at both high and low rates after 24 hours storage at room temperature before discharge. Cathode utilization at low rate on the upper voltage plateau was typically greater than about 55 percent.

Cells of Example 3 with cathodes containing presumably $Cu_2Bi_2O_7$ exhibited less capacity on the upper voltage plateau (e.g., 1.5 V) when discharged at low rate after 24 hours storage at room temperature. Furthermore, the upper voltage plateau disappeared completely when fresh cells were discharged at high rate, although an intermediate voltage plateau (e.g., 0.9 V) thought to be related to reduction of $Cu^{2+}$ to $Cu^{1+}$ persisted. The decrease in capacity on the upper voltage plateau possibly can be attributed to the solubility of $Cu_2Bi_2O_7$ in alkaline electrolyte resulting in self-discharge of $Bi^{5+}$ to $Bi^{3+}$. This hypothesis is consistent with the observation that a blue coloration, e.g., attributable to $Cu(OH)_4^{2-}$ ions, developed slowly when cathodes containing $Cu_2Bi_2O_7$ were immersed in alkaline electrolyte at room temperature.

Similar discharge behavior also was observed for cells of Example 4 with cathodes containing silver bismuthate after storage at room temperature for about 24 hours. Capacity on the upper voltage plateau was greatly reduced relative to that for cells discharged fresh (e.g., within 2 hours of fabrication). However, capacity on the intermediate voltage plateau (e.g., 1.2-1.4 V) thought to be related to reduction of $Ag^+$ to $Ag^0$ was undiminished relative to that of cells discharged within 2 hours of fabrication.

In the case of cells of Comparative Example 1 having cathodes containing soluble meta-sodium bismuthate, nearly all the capacity on the upper voltage plateau (e.g., 1.5 V) was absent when cells were discharged after 24 hours storage at room temperature. When the cells were discharged fresh (e.g., within 2 hours of fabrication), the capacity on the upper voltage plateau was somewhat diminished. However, the total low rate capacity to a 0.6 V cutoff voltage still was nearly 75 percent of the theoretical value.

Cells of Comparative Example 2 having cathodes containing bismuth tetroxide with an average bismuth oxidation state of +4 also had negligible capacity on the upper voltage plateau after 24 hours storage at room temperature. However, total capacity to a 0.6 V cutoff voltage still was equal to at least 75 percent of the theoretical value.

Cells of Comparative Example 3 having cathodes containing bismuth sesquioxide (i.e., not containing any $Bi^{5+}$) did not exhibit an upper voltage plateau when discharged. The high and low rate capacities to a 0.6 V cutoff voltage on the single voltage plateau were about 70 percent of the theoretical values.

From the above Examples and Comparative Examples, it is believed that for an alkaline cell having a gelled zinc anode, and a cathode containing a pentavalent bismuth-containing metal oxide with to have volumetric specific capacity of greater than about 0.8, 1.5, or 2.0 Ah/cm$^3$ (e.g., a gravimetric specific capacity of greater than about 100, 150, 200 mAh/g) for the cathode active material and an average running voltage for the cell of from about 1.4-1.7 V, the bismuth is preferably, predominantly pentavalent and the metal oxide is preferably, substantially insoluble in the alkaline electrolyte at room temperature. The cathode materials of Examples 1, 2, and 5 exhibit all of these characteristics. The cathode materials of Examples 3 and 4 5 are all partly soluble and thus some of the soluble $Bi^{5+}$ species can undergo self-discharge via oxidation of water resulting in oxygen evolution and formation of soluble $BiO_2^-$ ions. As a result, the specific capacity on the upper voltage plateau was decreased. The cathode materials of Comparative Examples 1 and 2 are readily soluble in alkaline electrolyte and can undergo extensive self-discharge when stored at room temperature. The cathode material of Comparative Example 3 does not contain any $Bi^{5+}$ and thus does not have a voltage plateau above about 0.8 V.

EXAMPLE 7

This example describes preparation of alkaline electrolyte solutions containing additives.

Electrolyte solutions with the desired KOH concentrations were prepared by diluting (i.e., v/v) a suitable amount of 45 wt. % KOH (Aldrich Chemical) stock solution with appropriate volumes of de-ionized water. The final KOH concentration was obtained by measuring and adjusting the specific gravity at 21° C. by adding (v/v) either KOH stock solution or de-ionized water. The electrolyte solutions containing the additives were prepared by dissolving the required amounts of the solid additives in the electrolyte solution at ambient room temperature. For example, a 9N KOH electrolyte solution saturated with barium hydroxide was prepared as follows: An excess of solid barium hydroxide hydrate, $Ba(OH)_2.8H_2O$(Alfa-Aesar, 98+%) was added to an appropriate volume of 9N KOH and the mixture stirred for 10 to 14 days at 60° C. to dissolve the barium hydroxide. The solution was allowed to cool to room temperature and to equilibrate for 2 days at ambient room temperature before it was vacuum filtered through a microporous polypropylene membrane filter (e.g., Millipore Express-Plus PES; 0.22 micron pore size) to remove any undissolved solid particles. Other 9N or 7N KOH electrolyte solutions saturated with aluminum hydroxide, barium fluoride, barium sulfate, barium carbonate, calcium hydroxide or strontium hydroxide also were prepared using the above procedure.

EXAMPLE 8

Magnesium bismuthate, $MgBi_2O_6$, was prepared as described in Example 2. The X-ray powder diffraction pattern of the washed and dried solid product revealed the presence of small amounts of bismuth oxide ($Bi_2O_3$) and bismuth oxychloride (BiOCl) in addition to $MgBi_2O_6$. The BiOCl phase was formed during the hydrothermal synthesis of $MgBi_2O_6$. $Bi_2O_3$ was present as an impurity phase in the sodium bismuthate starting material and also was formed during the hydrothermal synthesis of $MgBi_2O_6$. The solid product was treated with a stirred 9N KOH electrolyte solution saturated with barium hydroxide prepared as in Example 7, for about 4 to 5 days at ambient room temperature to remove the BiOCl impurity phase. The purified solid was collected by vacuum filtration, washed with several portions of de-ionized water, and dried at about 60° C. for about 24 hours in air to yield a dark purple-brown powder. The X-ray powder diffraction pattern of the washed and dried purified solid revealed the absence of diffraction peaks of BiOCl and the presence of very weak peaks due to trace amounts of $Bi_2O_3$.

To increase the electrical conductivity of a cathode formed of the $MgBi_2O_6$ powder, a thin coating of CoOOH was deposited onto the surface of the $MgBi_2O_6$ particles as described in Example 2. The fresh discharge performance of CoOOH-coated $MgBi_2O_6$ was evaluated in 635-type alkaline button cells. Cathode mixtures were prepared by mixing about 7.50 g of the $MgBi_2O_6$ (75 weight percent) active material with 2.00 g of an oxidation-resistant synthetic graphite (Timrex® SFG-15; Timcal, Ltd. Bodio, Switzerland) (20 weight percent), and 0.50 g of 9 N KOH electrolyte solution saturated with barium hydroxide (about 0.6 weight percent) using a laboratory blade mill. A cathode disk weighing about 0.45 g was pressed directly onto a fine nickel wire grid welded to the bottom of the cathode can using an applied pressure of 5,000 lbs. A single disk of separator having a layer of cellophane laminated onto a non-woven layer (Duralam® DT225; Duracell) was wetted with 9 N KOH electrolyte solution saturated with barium hydroxide and placed on top of the cathode disk such that the cellophane layer faced the cathode disk. A plastic seal was positioned on the anode can and 2.50 g of zinc anode slurry containing 60 weight percent zinc alloy particles, 39.5 weight percent electrolyte solution containing about 35 weight percent KOH and about 2 weight percent zinc oxide, and about 0.5 weight percent gelling agent added into the anode can. The cell was closed and hermetically sealed by crimping. Cells were stored for 24 hours at room temperature before discharge to ensure thorough wetting of both cathode and separator by electrolyte.

Cell discharge results are given in Table 1. The average OCV after 24 hours storage at room temperature was about 1.70 V. Average low-rate running voltage was about 1.65 V. The average low-rate specific capacity of button cells of Example 7 discharged at a nominal 10 mA/g (i.e., C/30) rate to a 0.8 V cutoff voltage was about 132 mAh/g, which corresponds to about 66% of the theoretical four-electron capacity of 199 mAh/g calculated for $MgBi_2O_6$. The average high-rate specific capacity of button cells of Example 8 discharged at a nominal 100 mA/g (i.e., 0.8 C) rate to a 0.8 V cutoff voltage was about 100 mAh/g, which corresponds to about 50% of the theoretical capacity. Average high-rate running voltage was about 1.4 V.

TABLE 1

| Sample | Fresh Capacity (mAhr/g) | | Stored Capacity (mAhr/g) |
|---|---|---|---|
| | Low-rate (10 mA/g) | High-rate (150 mA/g) | Low-rate (10 mA/g) |
| Example 2b | 116 | 89 | 0 |
| Example 8 | 132 | 100 | 0 |
| Example 9 | 150 | — | — |
| Example 10 | 162 | 118 | — |
| Example 11 | 146 | 106 | 140 |
| Example 12 | 155 | 116 | — |

Data is based on two to five, typically four, cells per sample.

EXAMPLE 9

Button cells were prepared as described in Example 8 with cathodes including CoOOH-coated $MgBi_2O_6$, oxidation-resistant graphite, and 9N KOH electrolyte saturated with barium hydroxide prepared as in Example 7. However, in place of a single separator disk, two identical separator disks, each having a layer of cellophane laminated onto a non-woven layer (e.g., Duralam DT225), were wetted with 9 N KOH electrolyte saturated with barium hydroxide and stacked on top of the cathode disk so that both cellophane layers faced the cathode disk. Cells typically were stored at room temperature for at least 24 hours prior to discharge. Discharge performance results for fresh cells are given in Table 1. The average low-rate specific capacity of button cells of Example 9 discharged at a nominal 10 mA/g (i.e., C/30) rate to a 0.8 V cutoff voltage was about 150 mAh/g, which corresponds to about 75% of the theoretical capacity. The average low-rate running voltage was about 1.65 V.

EXAMPLE 10

Button cells were prepared in the same manner described in Example 8 with cathodes including CoOOH-coated $MgBi_2O_6$, oxidation-resistant graphite, and 9N KOH electrolyte saturated with barium hydroxide prepared as in Example 7. However, in place of a single separator disk, two different laminated separator disks, one having a layer of cellophane laminated onto a non-woven layer (e.g., Duralam DT225) and the other a layer of cellophane laminated between two layers of a grafted, high-density polyethylene microporous membrane (e.g., SLO-083; Shanghai ShiLong High-Tech) were wetted with 9 N KOH electrolyte saturated with barium hydroxide and stacked on top of the cathode disk with the first separator disk having the microporous membranes positioned adjacent to the cathode and the second separator disk overlying the first separator disk and oriented so that the cellophane was facing the cathode. Cells were stored at room temperature for at least 24 hours prior to discharge. Cell discharge results are given in Table 1. The average low-rate specific capacity of button cells of Example 9 discharged at a nominal 10 mA/g (i.e., C/30) rate to a 0.8 V cutoff voltage was about 162 mAh/g, which corresponds to about 80% of the theoretical capacity. The average low-rate running voltage was about 1.65 V. The average high-rate specific capacity of button cells of Example 10 discharged at a nominal 100 mA/g (i.e., 0.8 C) rate to a 0.8 V cutoff voltage was about 118 mAh/g, which corresponds to about 60% of the theoretical capacity. The average high-rate running voltage was about 1.4 V.

EXAMPLE 11

Button cells were prepared in the same manner described in Example 8 with cathodes including CoOOH-coated $MgBi_2O_6$, oxidation-resistant graphite, and 9N KOH electrolyte saturated with barium hydroxide prepared as in Example 7. However, in place of a single separator disk, two laminated separator disks, each consisting of a cellophane layer laminated between two layers of a grafted, high-density polyethylene microporous membrane (e.g., SLO-083; Shanghai ShiLong High-Tech) were wetted with 9 N KOH electrolyte saturated with barium hydroxide and positioned on top the cathode disk one overlying the other. Cells were stored at room temperature for 24 hours prior to discharge. Cell discharge results are given in Table 1. The average low-rate specific capacity for button cells of Example 11 discharged at a nominal 10 mA/g (i.e., C/30) rate to a 0.8 V cutoff voltage was about 146 mAh/g, which corresponds to about 73% of the theoretical capacity. A portion of the button cells was held at ambient room temperature for two weeks before discharge. The average low-rate specific capacity of the button cells of Example 11 that had been stored for two weeks then discharged at a nominal 10 mA/g (i.e., C/30) rate to a 0.8 V cutoff voltage was about 140 mAh/g, which corresponds to about 70% of the theoretical capacity.

EXAMPLE 12

Button cells were prepared in the same manner described in Example 8 with cathodes including CoOOH-coated $MgBi_2O_6$, oxidation-resistant graphite, and 9N KOH electrolyte saturated with barium hydroxide prepared as in Example 7. However, in place of a single separator disk, three laminated separator disks, one having a layer of cellophane laminated onto a non-woven layer (e.g., Duralam DT225) and the other two having a layer of cellophane laminated between two layers of a grafted, high-density polyethylene microporous membrane (SLO-083; Shanghai ShiLong High-Tech) were wetted with 9 N KOH electrolyte saturated with barium hydroxide and stacked on top of the cathode disk with one of the two separator disks having the microporous membranes positioned adjacent to the cathode and the other overlying the first and the third separator disk overlying the first two and oriented so that the cellophane was facing the cathode. Cells were stored at room temperature for at least 24 hours prior to discharge. Cell discharge results are given in Table 1. The average low-rate specific capacity of button cells of Example 12 discharged at a nominal 10 mA/g (i.e., C/30) rate to a 0.8 V cutoff voltage was about 155 mAh/g, which corresponds to about 78% of the theoretical capacity. The average low-rate running voltage was about 1.65 V. The average high-rate specific capacity of button cells of Example 12 discharged at a nominal 100 mA/g (i.e., 0.8C) rate to a 0.8 V cutoff voltage was about 116 mAh/g, which corresponds to about 58% of the theoretical capacity. The average high-rate running voltage was about 1.4 V.

The use of alkaline electrolyte solution saturated with barium hydroxide improved the specific capacity of button cells including $Bi+^5$-containing cathode materials, e.g., CoOOH-coated $MgBi_2O_6$, discharged at both high and low drain rates as shown in Table 1. Specifically, the improvement in specific capacity for cells discharged at low-rate was about 14% and at high-rate was about 12% compared to cells containing 9 N KOH electrolyte without the barium hydroxide additive.

The inclusion of multiple disks of commercial ion-selective separators improved discharge performance of cells, especially after storage. For example, cells of Example 10 including a combination of two types of separator disks, one consisting of a cellophane layer laminated to a non-woven layer and the other consisting of a cellophane layer laminated between two layers of a grafted, high-density polyethylene microporous membrane had a fresh low-rate capacity about 23% greater than that of cells of Example 8 containing a single separator disk having a cellophane layer laminated to a non-woven layer. The low-rate capacity loss for cells stored two weeks at ambient room temperature before discharge was about 4% for cells of Example 11 containing two separator disks consisting of a cellophane layer laminated between two layers of a grafted, high-density polyethylene microporous membrane. In the case of cells of Example 2a containing a single separator disk having a cellophane layer laminated to a non-woven layer and 9 N KOH electrolyte without the barium hydroxide additive, none of the cells retained any capacity above 0.8 V after 1 week storage at ambient room temperature. The use of two or more separator disks containing different types of ion-selective layers was more effective than the use of multiple separator disks containing the same type ion-selective layer. For example, the low-rate capacity of cells of Example 10 containing two different type separator disks is greater than that of cells of either Example 9 or Example 11, each containing two disks of the same type of ion-selective separator. Similarly, the low-rate capacity of cells of Example 12 containing three separator disks of two different type separators (e.g., same types as cells of Example 10) is also greater than that of cells of either Example 9 or Example 11. Without wishing to be bound by theory, it is believed that a combination of two or more types of ion-selective separator is more effective at inhibiting diffusion of bismuth-containing ionic species than multiple layers of any one type of ion-selective separator. It is also believed that by positioning a separator containing both cellophane and microporous membrane layers so that the microporous membrane is adjacent to the $Bi^{5+}$-containing metal oxide cathode, oxidation of the cellophane layer can be reduced. Further, the observed improvement in cell performance resulting from the use of an electrolyte saturated with barium hydroxide is additive to the improvement resulting from the use of multiple separators containing two or more types of ion-selective layers.

All references, such as patent applications, publications, and patents, referred to herein are incorporated by reference in their entirety.

Other embodiments are in the claims.

What is claimed is:

1. A primary battery, comprising:
   a cathode comprising an oxide containing an alkali metal and pentavalent bismuth, the alkali metal being lithium or potassium;
   an anode;
   a separator between the cathode and the anode; and
   an alkaline electrolyte.

2. The battery of claim 1, wherein the oxide comprises an electrically conductive portion.

3. The battery of claim 2, wherein the electrically conductive portion is an electrically conductive surface coating comprising carbon or a metal oxide.

4. The battery of claim 3, wherein the electrically conductive surface coating comprises a material selected from the group consisting of graphite, carbon black, acetylene black, cobalt oxide, cobalt oxyhydroxide, silver oxide, silver nickel oxide, nickel oxyhydroxide, and indium oxide.

5. The battery of claim 1, wherein the anode comprises zinc.

6. The battery of claim 1, wherein the electrolyte comprises lithium hydroxide, sodium hydroxide, or potassium hydroxide.

7. The battery of claim 1, wherein the separator is capable of preventing soluble bismuth species from diffusing from the cathode to the anode.

8. The battery of claim 1, wherein the separator is capable of trapping soluble bismuth species.

9. The battery of claim 1, wherein the separator comprises a plurality of layers.

10. The battery of claim 1, wherein the separator comprises a non-woven layer.

11. The battery of claim 1, wherein the separator comprises cellophane.

12. The battery of claim 1, wherein the separator comprises a microporous membrane.

13. The battery of claim 12, wherein the microporous layer is adjacent to the cathode.

14. The battery of claim 1, wherein the separator comprises a non-microporous polymer-based solid gel membrane.

15. The battery of claim 1, wherein the separator comprises an ion-selective layer.

16. The battery of claim 15, wherein the separator comprises a plurality of ion-selective layers.

17. The battery of claim 1, further comprising a first material capable of reducing the solubility of the oxide in the electrolyte.

18. The battery of claim 17, wherein the first material comprises an alkaline earth metal 19. The battery of claim 17, wherein the first material is selected from the group consisting of barium hydroxide, barium oxide, barium fluoride, and barium sulfate, magnesium fluoride, calcium fluoride, strontium hydroxide, strontium fluoride, strontium oxide, aluminum hydroxide, zinc oxide, calcium hydroxide, and calcium oxide.

20. The battery of claim 17, wherein the first material comprises an alkali metal.

21. The battery of claim 20, wherein the first material comprises potassium fluoride.

22. The battery of claim 17, wherein the first material comprises a lanthanide element.

23. The battery of claim 22, wherein the first material is selected from the group consisting of lanthanum hydroxide, cerium hydroxide, praseodymium hydroxide, neodymium hydroxide, and europium hydroxide.

24. The battery of claim 17, wherein the first material comprises a transition metal element.

25. The battery of claim 24, wherein the first material comprises zinc oxide.

26. The battery of claim 17, wherein the first material comprises a main group element.

27. The battery of claim 26, wherein the first material is selected from the group consisting of aluminum hydroxide, aluminum oxide, and bismuth oxide.

28. The battery of claim 17, wherein the electrolyte is saturated with the first material.

29. A primary battery, comprising:
a cathode comprising an oxide containing an alkaline earth metal and pentavalent bismuth;
an anode;
a separator between the cathode and the anode; and
an alkaline electrolyte.

30. The battery of claim 29, wherein the oxide comprises an electrically conductive portion.

31. The battery of claim 30, wherein the electrically conductive portion is an electrically conductive surface coating comprising carbon or a metal oxide.

32. The battery of claim 31, wherein the electrically conductive surface coating comprises a material selected from the group consisting of graphite, carbon black, acetylene black, cobalt oxide, cobalt oxyhydroxide, silver oxide, silver nickel oxide, nickel oxyhydroxide, and indium oxide.

33. The battery of claim 29, wherein the anode comprises zinc.

34. The battery of claim 29, wherein the electrolyte comprises lithium hydroxide, sodium hydroxide, or potassium hydroxide.

35. The battery of claim 29, wherein the separator is capable of preventing soluble bismuth species from diffusing from the cathode to the anode.

36. The battery of claim 29, wherein the separator is capable of trapping soluble bismuth species.

37. The battery of claim 29, wherein the separator comprises a plurality of layers.

38. The battery of claim 29, wherein the separator comprises a non-woven layer.

39. The battery of claim 29, wherein the separator comprises cellophane.

40. The battery of claim 29, wherein the separator comprises a microporous membrane.

41. The battery of claim 40, wherein the microporous layer is adjacent to the cathode.

42. The battery of claim 29, wherein the separator comprises an ion-selective layer.

43. The battery of claim 42, wherein the separator comprises a plurality of ion-selective layers.

44. The battery of claim 29, wherein the separator comprises a non-microporous polymer-based solid gel membrane.

45. The battery of claim 29, further comprising a first material capable of reducing the solubility of the oxide in the electrolyte.

46. The battery of claim 45, wherein the first material comprises an alkaline earth element.

47. The battery of claim 45, wherein the first material is selected from the group consisting of barium hydroxide, barium oxide, barium fluoride, and barium sulfate, magnesium fluoride, calcium fluoride, strontium hydroxide, strontium fluoride, strontium oxide, aluminum hydroxide, zinc oxide, calcium hydroxide, and calcium oxide.

48. The battery of claim 45, wherein the first material comprises an alkali element.

49. The battery of claim 48, wherein the first material comprises potassium fluoride.

50. The battery of claim 45, wherein the first material comprises a lanthanide element.

51. The battery of claim 50, wherein the first material is selected from the group consisting of lanthanum hydroxide, cerium hydroxide, praseodymium hydroxide, neodymium hydroxide, and europium hydroxide.

52. The battery of claim 45, wherein the first material comprises a transition metal element.

53. The battery of claim 52, wherein the first material comprises zinc oxide.

54. The battery of claim 45, wherein the first material comprises a main group element.

55. The battery of claim 54, wherein the first material is selected from the group consisting of aluminum hydroxide, aluminum oxide, and bismuth oxide.

56. The battery of claim 29, wherein the electrolyte is saturated with the first material.

57. A primary battery, comprising:
a cathode comprising an oxide, other than $AgBiO_3$, containing a metal and pentavalent bismuth, the metal being selected from the consisting a main group metals and transition metals;
an anode;
a separator between the cathode and the anode; and
an alkaline electrolyte.

58. The battery of claim 57, wherein the oxide comprises an electrically conductive portion.

59. The battery of claim 58, wherein the electrically conductive portion is an electrically conductive surface coating comprising carbon or a metal oxide.

60. The battery of claim 58, wherein the electrically conductive surface coating comprises a material selected from the group consisting of graphite, carbon black, acetylene black, cobalt oxide, cobalt oxyhydroxide, silver oxide, silver nickel oxide, nickel oxyhydroxide, and indium oxide.

61. The battery of claim 57, wherein the anode comprises zinc.

62. The battery of claim 57, wherein the electrolyte comprises lithium hydroxide, sodium hydroxide, or potassium hydroxide.

63. The battery of claim 57, wherein the separator is capable of preventing soluble bismuth species from diffusing from the cathode to the anode.

64. The battery of claim 57, wherein the separator is capable of trapping soluble bismuth species.

65. The battery of claim 57, wherein the separator comprises a plurality of layers.

66. The battery of claim 57, wherein the separator comprises a non-woven layer.

67. The battery of claim 57, wherein the separator comprises cellophane.

68. The battery of claim 57, wherein the separator comprises a microporous membrane.

69. The battery of claim 68, wherein the microporous layer is adjacent to the cathode.

70. The battery of claim 57, wherein the separator comprises an ion-selective layer.

71. The battery of claim 70, wherein the separator comprises a plurality of ion-selective layers.

72. The battery of claim 57, further comprising a first material capable of reducing the solubility of the oxide in the electrolyte.

73. The battery of claim 72, wherein the first material comprises an alkaline earth metal.

74. The battery of claim 72, wherein the first material is selected from the group consisting of barium hydroxide, barium oxide, barium fluoride, and barium sulfate, magnesium fluoride, calcium fluoride, strontium hydroxide, strontium fluoride, strontium oxide, aluminum hydroxide, zinc oxide, calcium hydroxide, and calcium oxide.

75. The battery of claim 72, wherein the first material comprises an alkali metal.

76. The battery of claim 75, wherein the first material comprises potassium fluoride.

77. The battery of claim 72, wherein the first material comprises a lanthanide element.

78. The battery of claim 77, wherein the first material is selected from the group consisting of lanthanum hydroxide, cerium hydroxide, praseodymium hydroxide, neodymium hydroxide, and europium hydroxide.

79. The battery of claim 72, wherein the first material comprises a transition metal element.

80. The battery of claim 79, wherein the first material comprises zinc oxide.

81. The battery of claim 72, wherein the first material comprises a main group element.

82. The battery of claim 81, wherein the first material selected from the group consisting of aluminum hydroxide, aluminum oxide, and bismuth oxide.

83. The battery of claim 72, wherein the electrolyte is saturated with the first material.

84. A primary battery, comprising:
a cathode comprising an oxide containing an alkali metal and pentavalent bismuth, wherein the oxide comprises a material selected from the group consisting of $MBiO_3$, $M_3BiO_4$, $M_7BiO_6$, $M_4Bi_2O_7$, and $M_5Bi_3O_{10}$, where M is Li, Na, K, Rb and/or Cs; $Li_5BiO_5$; $Li_6KBiO_6$; and $Li_6RbBiO_3$;
an anode;
a separator between the cathode and the anode; and an alkaline electrolyte
wherein the oxide comprises an electrically conductive surface comprising carbon or a metal oxide.

85. The battery of claim 84, wherein the electrically conductive surface coating comprises a material selected from the group consisting of graphite, carbon black, acetylene black, cobalt oxide, cobalt oxyhydroxide, silver oxide, silver nickel oxide, nickel oxyhydroxide, and indium oxide.

86. A primary battery, comprising:
a cathode comprising at least 30% of $AgBiO_3$ and/or $Ag_{25}Bi_3O_{18}$ by weight, and
an anode;
a separator between the cathode and the anode; and an alkaline electrolyte.

87. The battery of claim 86, wherein the $AgBiO_3$ comprises an electrically conductive portion.

88. The battery of claim 87, wherein the electrically conductive portion is an electrically conductive surface coating comprising carbon or a metal oxide.

89. The battery of claim 86, wherein the cathode comprises at least 40% of $AgBiO_3$ and/or $Ag_{25}Bi_3O_{18}$ by weight.

90. The battery of claim 86, wherein the electrically conductive surface coating comprises a material selected from the group consisting of graphite, carbon black, acetylene black, cobalt oxide, cobalt oxyhydroxide, silver oxide, silver nickel oxide, nickel oxyhydroxide, and indium oxide.

91. The battery of claim 86, wherein the cathode comprises at least 60% of $AgBiO_3$ or $Ag_{25}Bi_3O_{18}$ by weight.

92. The battery of claim 1, wherein the oxide is selected from the group consisting of $MBiO_3$, $M_3BiO_4$, $M_7BiO_6$, $M_4Bi_2O_7$, and $M_5Bi_3O_{10}$, where M is Li, or K; $Li_5BiO_5$; and $Li_6KBiO_6$; $Li_6RbBiO_3$.

93. The battery of claim 29, wherein the oxide is selected from the group consisting of $MgBi_2O_6$, $SrBi_2O_6$, $Sr_2Bi_2O_7$, $LiSr_3BiO_6$, $NaSr_3BiO_6$, $(Ba,K)BiO_3$, $(Sr,K)BiO_3$, $Li_2Ba_5Bi_2O_{11}$, and $Ba_2Bi_2O_6$.

94. The battery of claim 57, wherein the oxide is selected from the group consisting of $ZnBi_2O_6$, $Cu_2Bi_2O_7$, $CdBi_2O_6$, $Ag_{25}Bi_3O_{18}$, $Ba_2YBiO_6$, $Ba_2LaBiO_6$, $Sr_2NdBiO_6$, $Ba_2InBiO_6$, $Ba(Bi,Pb)O_3$, $Sr_{18}Ru_{1.9}Bi_{4.1}O_{33}$, $Li_8PdBi_2O_{10}$, and $Sr_2ScBiO_6$.

95. The battery of claim 57, wherein the metal is not silver.

96. The battery of claim 57, wherein the oxide contains a metal selected from the group consisting of lanthanide metals.

* * * * *

UNITED STATES PATENT AND TRADEMARK OFFICE
CERTIFICATE OF CORRECTION

PATENT NO. : 7,537,863 B2
APPLICATION NO. : 10/913922
DATED : May 26, 2009
INVENTOR(S) : Cahit Eylem et al.

It is certified that error appears in the above-identified patent and that said Letters Patent is hereby corrected as shown below:

On the Title page, Item [56] under "Other Publications", replace "Bi2O3" and insert --$Bi_2O_3$--

On the Title page, Item [56] under "Other Publications", replace "Socisety," and insert --Society,--

In claim 18, line 2, delete "metal" and insert --metal.--

In claim 34, line 2, delete "hydroxide,sodium" and insert --hydroxide, sodium--

In Claim 57, line 4, delete "the consisting a" and insert --the group consisting of--

In Claim 84, line 5, delete "$M_7BiO_6,M_4Bi_2O_7,$and $M_5Bi_3O_{10},$where" and insert --$M_7BiO_6$, $M_4Bi_2O_7$, and $M_5Bi_3O_{10}$, where--

In Claim 84, line 6, delete "$Li_5BiO_5$; $Li_6KBiO_6$;" and insert --$Li_5BiO_5$; $Li_6KBiO_6$;--

In Claim 86, line 3, delete "$Ag_{25}Bi_3O_{18}$by" and insert --$Ag_{25}Bi_3O_{18}$ by--

In Claim 91, line 2, delete "$Ag_{25}Bi_3O_{18}$by" and insert --$Ag_{25}Bi_3O_{18}$ by--

In Claim 92, lines 2 and 3, delete "$MBiO_3,M_3BiO_4,M_7BiO_6,M_4Bi_2O_7,$and $M_5Bi_3O_{10},$where" and insert --$MBiO_3$, $M_3BiO_4$, $M_7BiO_6$, $M_4Bi_2O_7$, and $M_5Bi_3O_{10}$, where--

In Claim 92, line 4, delete "$Li_6KBiO_6$;" and insert --$Li_6KBiO_6$;--

In Claim 93, line 2, delete "$MgBi_2O_6,SrBi_2O_6,Sr_2Bi_2O_7,$" and insert --$MgBi_2O_6$, $SrBi_2O_6$, $Sr_2Bi_2O_7$,--

UNITED STATES PATENT AND TRADEMARK OFFICE
CERTIFICATE OF CORRECTION

PATENT NO.       : 7,537,863 B2
APPLICATION NO.  : 10/913922
DATED            : May 26, 2009
INVENTOR(S)      : Cahit Eylem et al.

It is certified that error appears in the above-identified patent and that said Letters Patent is hereby corrected as shown below:

In Claim 93, line 3, delete "$NaSr_3BiO_6,(Ba,K)BiO_3,$" and insert --$NaSr_3BiO_6, (Ba,K)BiO_3,$--

Signed and Sealed this

Seventh Day of July, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,537,863 B2
APPLICATION NO. : 10/913922
DATED : May 26, 2009
INVENTOR(S) : Cahit Eylem et al.

It is certified that error appears in the above-identified patent and that said Letters Patent is hereby corrected as shown below:

On the Title page, Item [56] under "Other Publications", replace "Bi2O3" and insert --$Bi_2O_3$--

On the Title page, Item [56] under "Other Publications", replace "Socisety," and insert --Society,--

Column 29, in claim 18, line 11, delete "metal" and insert --metal.--

Column 29, in claim 34, line 59, delete "hydroxide,sodium" and insert --hydroxide, sodium--

Column 30, in Claim 57, line 51, delete "the consisting a" and insert --the group consisting of--

Column 32, in Claim 84, line 5, delete "$M_7BiO_6,M_4Bi_2O_7$,and $M_5Bi_3O_{10}$,where" and insert --$M_7BiO_6$, $M_4Bi_2O_7$, and $M_5Bi_3O_{10}$, where--

Column 32, in Claim 84, line 6, delete "$Li_5BiO_5$; $Li_6KBiO_6$;" and insert --$Li_5BiO_5$; $Li_6KBiO_6$;--

Column 32, in Claim 86, line 20, delete "$Ag_{25}Bi_3O_{18}$by" and insert --$Ag_{25}Bi_3O_{18}$ by--

Column 32, in Claim 91, line 37, delete "$Ag_{25}Bi_3O_{18}$by" and insert --$Ag_{25}Bi_3O_{18}$ by--

Column 32, in Claim 92, lines 39 and 40, delete "$MBiO_3,M_3BiO_4,M_7BiO_6,M_4Bi_2O_7$,and $M_5Bi_3O_{10}$,where" and insert --$MBiO_3$, $M_3BiO_4$, $M_7BiO_6$, $M_4Bi_2O_7$, and $M_5Bi_3O_{10}$, where--

Column 32, in Claim 92, line 41, delete "$Li_6KBiO_6$;" and insert --$Li_6KBiO_6$;--

Column 32, in Claim 93, line 43, delete "$MgBi_2O_6,SrBi_2O_6,Sr_2Bi_2O_7$," and insert --$MgBi_2O_6$, $SrBi_2O_6$, $Sr_2Bi_2O_7$,--

UNITED STATES PATENT AND TRADEMARK OFFICE
CERTIFICATE OF CORRECTION

PATENT NO. : 7,537,863 B2
APPLICATION NO. : 10/913922
DATED : May 26, 2009
INVENTOR(S) : Cahit Eylem et al.

It is certified that error appears in the above-identified patent and that said Letters Patent is hereby corrected as shown below:

Column 32, in Claim 93, line 44, delete "$NaSr_3BiO_6,(Ba,K)BiO_3,$" and insert --$NaSr_3BiO_6, (Ba,K)BiO_3,$--

This certificate supersedes the Certificate of Correction issued July 7, 2009.

Signed and Sealed this

Fourth Day of August, 2009

JOHN DOLL
*Acting Director of the United States Patent and Trademark Office*